(12) United States Patent
Strobel et al.

(10) Patent No.: US 9,531,491 B2
(45) Date of Patent: Dec. 27, 2016

(54) COMMUNICATION METHOD, APPARATUS AND SYSTEM

(71) Applicant: Lantiq Deutschland GmbH, Neubiberg (DE)

(72) Inventors: Rainer Strobel, Ehingen (DE); Lilia Smaoui, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 376 days.

(21) Appl. No.: 13/766,753

(22) Filed: Feb. 13, 2013

(65) Prior Publication Data

US 2013/0208579 A1 Aug. 15, 2013

Related U.S. Application Data

(60) Provisional application No. 61/598,270, filed on Feb. 13, 2012, provisional application No. 61/601,943, filed on Feb. 22, 2012.

(30) Foreign Application Priority Data

Feb. 22, 2012 (EP) .................................... 12001173
Feb. 24, 2012 (EP) .................................... 12001248

(51) Int. Cl.
*H04B 15/00* (2006.01)
*H04L 5/16* (2006.01)
(Continued)

(52) U.S. Cl.
CPC . *H04J 3/10* (2013.01); *H04B 3/32* (2013.01); *H04M 11/062* (2013.01)

(58) Field of Classification Search
USPC ........................................................ 370/201
See application file for complete search history.

(56) References Cited

U.S. PATENT DOCUMENTS 6,141,565 A 10/2000 Feuerstein et al.
6,205,220 B1 * 3/2001 Jacobsen et al. ............. 379/417
(Continued)

FOREIGN PATENT DOCUMENTS

EP 0730382 A2 9/1996
WO 2004080075 A1 9/2004
WO 2010018562 A1 2/2010

*Primary Examiner* — Edan Orgad
*Assistant Examiner* — Sithu Ko
(74) *Attorney, Agent, or Firm* — Eschweiler & Associates, LLC

(57) ABSTRACT

Various embodiments are presented of a time sharing electronic communication system, including a central unit, a crosstalk channel, and communication units such as transceivers and remote terminals. Also presented are various methods for configuring and operating the elements of such a system to enhance communication between communication units within the system. In some embodiments, locally optimal configurations are pre-computed, stored in memory, and processed into time sharing information which is communicated to communication units. The time sharing information allows the communication units to transmit at times and power levels in such a manner as to enhance the communication within the system. In some embodiments, locally optimal configurations are computed, stored, and processing, substantially dynamically, allowing substantially real time adjustment of transmission times and power levels to enhance the communication within the system.

21 Claims, 13 Drawing Sheets

(51) Int. Cl.
*H04J 3/10* (2006.01)
*H04B 3/32* (2006.01)
*H04M 11/06* (2006.01)

(56) References Cited

U.S. PATENT DOCUMENTS

| | | |
|---|---|---|
| 6,791,995 B1 * | 9/2004 | Azenkot et al. .............. 370/436 |
| 6,839,425 B1 * | 1/2005 | Huang et al. ............. 379/399.01 |
| 7,245,628 B2 * | 7/2007 | Shi et al. ....................... 370/437 |
| 2005/0123027 A1 | 6/2005 | Cioffi et al. |
| 2010/0074263 A1 | 3/2010 | Bry et al. |
| 2010/0177838 A1 * | 7/2010 | Schenk ......................... 375/285 |

* cited by examiner

| SS | M1 DS data symbols | M2 DS2 data symbols | M2 US data symbols | M1 DS data symbols | M2 US data symbols | SS | M1 DS data symbols |

Fig. 17

DS1: | SS | M1 DS1 data symbols | M2 DS2 data symbols | M3 US1 data symbols | M4 DS2 data symbols | M5 US2 data symbols | M6 DS1 data symbols | M7 US2 data symbols | SS |

US1: | SS | M1 DS1 data symbols | Idle | M3 US1 data symbols | Idle | M6 DS1 data symbols | Idle | SS |

DS2: | SS | Idle | M2 DS2 data symbols | Idle | M4 DS2 data symbols | Idle | SS |

US2: | Idle | M5 US2 data symbols | Idle | M7 US2 data symbols | Idle |

Fig. 18

COMMUNICATION METHOD, APPARATUS AND SYSTEM

RELATED APPLICATIONS

This Application claims priority to U.S. Provisional Application 61/598,270, which was filed on Feb. 13, 2012, U.S. Provisional Application 61/601,943, which was filed on Feb. 22, 2012, European Patent Application 12001173.9, which was filed on Feb. 22, 2012, and European Patent Application, 12001248.9 which was filed on Feb. 24, 2012. The entire contents of the indicated prior filed Applications are incorporated herein by reference.

BACKGROUND

In many communication transmission systems, there are multiple parallel transmissions bound together which can cause crosstalk between the lines. This results in a coupling between the achievable data rates of the lines within the binder, which means that increasing the transmit power, and thus the rate, of one link, may reduce the data rates of the other links. Transmissions in a cable binder are one example of such a communication transmission system. Crosstalk also occurs in wireless communication, in which adjacent or nearby channels may be subject to what is sometimes called "co-channel interference". Many kinds of communication systems, with multiple communication lines or channels located in close proximity to one another, are subject to the phenomenon of crosstalk.

Typical solutions to this problem include physical separation of lines, mechanical shielding of lines from one another, and reduction in either the data rates or the communication quality or both, in the face of the effects of crosstalk. Another solution is called "Upstream Power Backoff", in which a reference length of transmission and two parameters are used to calculate transmission powers assigned to each communication line at various times. As the number of communication lines increases, the scheduling complexities become such that typical optimization algorithms, including Upstream Power Backoff, simply cannot be used. Alternative solutions may then use other algorithms, such as iterative water filling, but none of these provide a perfect solution. Moreover, alternative solutions have disadvantages in that they cannot adjust power levels of multiple lines substantially in real-time, and they cannot switch between multiple pre-calculated configurations substantially in real-time.

Further, in the alternative solutions, a system may be planned as an optimal configuration for a particular optimization criterion. There are at least three such optimization criteria which may be implemented. Each optimization criterion is, at the time of its implementation, an alternative to the other two criteria, according to the alternative solutions. These three alternative implementation criteria are "absolute fairness", which means maximizing the rate of the weakest link such that rate $u=\max \min_i(R_i)$, "relative fairness", which means maximizing the overall system rate but subject to the condition that each remote terminal is communicating at a specific minimum, where $u=\max \Sigma_i(\log R_i)$, or "system maximization", which means maximizing the weighted sum of all data rates $u=\max \Sigma_i(w_i \cdot R_i)$.

The Digital Subscriber Line (DSL) technology, during all its history, attempted to increase the bit rate in the aim to deliver more broadband services to the customer. Unfortunately, copper loops deployed from the Central Office (CO) to customer premises equipment (CPE) are rather long and do not allow transmission of data with bit rates more than few Mb/s. Therefore, to increase the customer available bit rates, modern access networks use street cabinets, Multi Dwelling Unit (MDU)-cabinets, and similar arrangements: the cabinet is connected to the CO by a high-speed fiber communication line, e.g., gigabit passive optical network (GPON) and installed close to the customer premises. From these cabinets, high-speed DSL systems, such as Very-High-Bit-Rate DSL (VDSL), provide connection to the CPE. The currently deployed VDSL systems (ITU-T Recommendation G.993.2) have range of operation about 1 km, providing bit rates in the range of tens of Mb/s. To increase the bit rate of VDSL systems deployed from the cabinet, recent ITU-T Recommendation G.993.5 defined vectored transmission that allows increasing upstream and downstream bit rates up to 100 Mb/s.

Recent trends in the access communications market show that 100 Mb/s is still not sufficient for the close future, and bit rates up to 1 Gb/s are required. This could be only achieved if copper pairs connected the CPE to the fiber backbone are as short as 100 m-200 m. This requires installation of small street/MDU cabinets, called Distribution Points (DP) that intend to serve a very small number of potential users; the number of potential users shown by recent analysis internationally is 8-16, although some sources report higher required number of served users, like 24 or even 32. Therefore, DPs shall allow very flexible installation practices: they should be light and easily installed on a pole or house wall, or basement, without air-conditioning. These requirements bring substantial restrictions of the power consumption of a DP. Besides, DP (including housings and installed equipment) has to be very inexpensive, because with rather high probability, due to limited customer area, only a single subscriber may be connected to a particular installation for rather long time). Therefore, DP has to be equipped with a different type of transmission system than currently known DSL, that provides extremely low power consumption and inexpensive design, while provides very high bit rates (up to 1 Gb/s) and scalability to bigger number of users (if installed in protected environment, such as air-conditioned high-risers, for instance).

Two solutions were recently proposed for a DP:
  a first approach that uses time division duplexing between upstream and downstream; and
  a second approach that uses Synchronized Time Division Multiple Access (STDMA).

The first approach requires higher power consumption and is more complex, but provides higher total bit rate (sum of all bit rate from the DP to the CPE) and what is called "sustainable bit rate", which is an average bit rate guarantee for a service over a long period of time.

In the second approach, the sustainable bit rate is shared between users, and thus is lower than in case of the first approach and scales down as amount of users grows. Thus, in the case of many users the second approach may result in insufficient sustainable bit rate.

To cover all varieties of deployment scenarios and expected use cases, both approaches may be required. Therefore, a transmission method from a DP shall be capable to operate in a DP using either the first approach, the second approach or a combination of both.

The task of finding transceiver settings in a communication system that lead to a desired rate configuration, typically requires very complex optimization. The effort to find optimal parameters is often so serious and burdensome, that only inexact approximations of optimal settings are used. Further, as the number of lines in systems increase, the disadvantages of the alternative solutions become increasingly severe.

BRIEF DESCRIPTION OF THE DRAWINGS

The embodiments that are herein described, are by way of example only, with reference to the accompanying drawings. No attempt is made to show structural details in more detail than is necessary for a fundamental understanding. In the drawings:

FIG. 17 shows an embodiment of a superframe that includes three DS and three US slots.

FIG. 18 shows an exemplary embodiment of a superframe structure and STDMA transmission time line for two transmission media.

DETAILED DESCRIPTION

Figure 1:
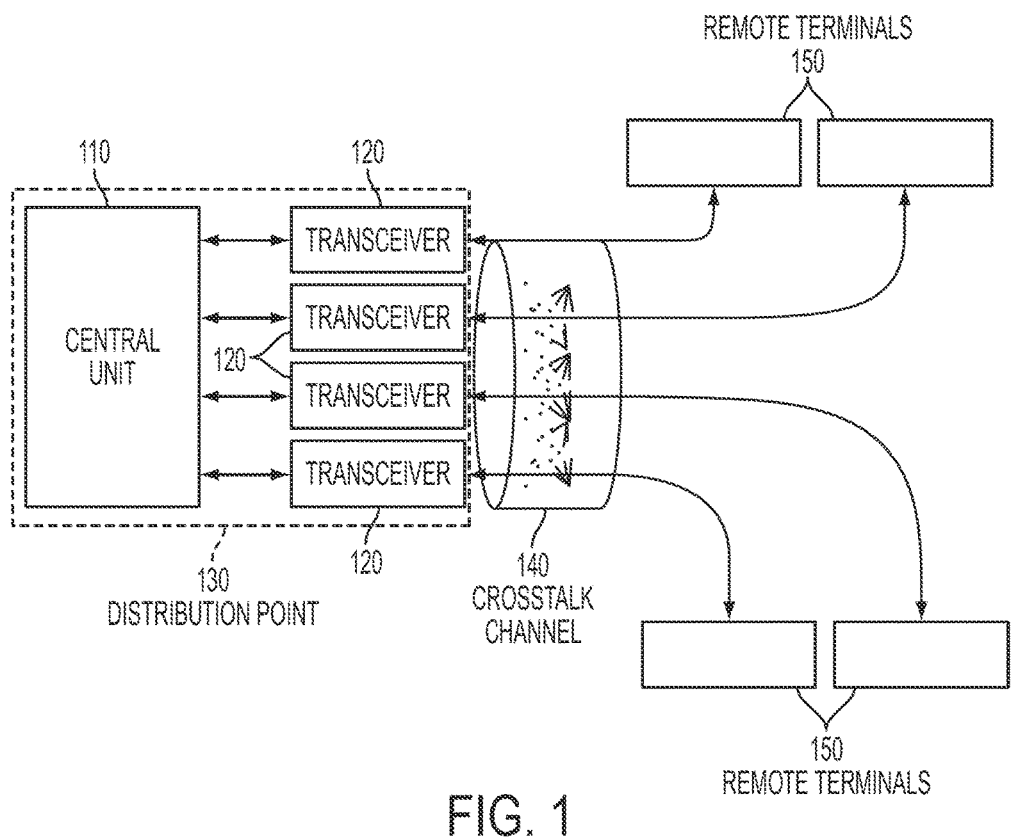
FIG. 1 illustrates a multi-user transmission system.

A transceiver architecture is disclosed herein with respect to at least one embodiment that is able to switch among different configurations, thus enhancing communication rates and allowing the overall system performance to move closer toward optimization. The enhanced communication rates may result in higher throughput rates, or higher quality of transmissions, or both. In some embodiments, data rates available to different communication units may be enhanced, possibly even beyond guaranteed rates, by allocating the bandwidth of other units that are either inactive or that are using less than their own guaranteed bandwidth.

A system is provided that is operative to serve multiple electronic communication lines. The system includes a distribution point, which includes a central unit and multiple transceivers. The system also includes multiple line interfaces, a crosstalk channel, and multiple remote terminals. The system is configured to compute locally optimal communication configurations, store in memory data about said configurations, process said data into time sharing information, and convey such time sharing information to the transceivers and the remote terminals. The receivers and remote terminals later transmit in accordance with such time sharing information.

A system is provided that is operative to serve multiple electronic communication lines. The system includes a distribution point, which itself includes a central unit and multiple transceivers. The system also includes multiple line interfaces, and a crosstalk channel. The system is configured to compute locally optimal communication configurations, store in memory data about said configurations, process said data into time sharing information, and to convey such time sharing information to the transceivers. The transceivers later transmit in accordance with such time sharing information.

In another variant, a central unit in communication system, where said system is operative to serve multiple electronic communication lines. The communication unit includes a unit that receives electronic data related to receiver channel characteristics. The communication unit also includes an optimizer that operates an optimization routine to compute multiple locally optimal configurations and to identify locally optimal configuration points needed to reach desired data rates. The communication unit also includes a memory to store the locally optimal configurations and locally optimal configuration points. The communication unit also includes means for computing a media access plan to achieve optimal system communication according to a criterion. The communication unit also includes means for conveying the media access plan to transceivers that will transmit in accordance with the plan.

One embodiment is a method for enhancing communication in a system with a plurality of electronic communication connections. Multiple locally optimal configurations and parameters required to build such configurations are pre-computed. Data about the configurations and the parameters are stored in a memory. The data is processed to create time sharing information. The time sharing information is conveyed to communication units so that such communication units may transmit at such times and such power levels as to achieve, according to some criterion, enhanced communication within the system.

In a first aspect the embodiment encompasses a method for use in a system having a plurality of units and at least one resource shared between the units. The method comprises pre-determining a plurality of preferred system configurations for use of the shared resource; storing in a memory parameter values reflective of the plurality of preferred system configurations; and processing said parameter values to create sharing information. An embodiment comprises providing said sharing information to one or more of said plurality of units. At least one effect of the method according to the embodiment in the first aspect is that such units may use the resource shared between the units, herein also simply called "shared resource", in accordance with the preferred system configuration so as to achieve enhanced use of the shared resource within the system. In an embodiment the enhanced use may be measured or otherwise determined according to a pre-determined criterion. A particular effect of the embodiment may be use of the shared resource beyond capacity as determined conventionally by taking into account guaranteed rates of use of the shared resource and thus reduce under-use of the shared resource.

In an embodiment pre-determining the plurality of preferred system configurations includes pre-determining the criterion according to which the preference is to be established. A preference may be defined so as to achieve an optimal system configuration. In an embodiment according to the embodiment in the first aspect the criterion is selected from the group consisting of (i) a rule for absolute fairness; (ii) a rule for relative fairness; and (iii) a rule for maximizing a sum of all rates of use of the shared resource.

In an embodiment according to the embodiment in the first aspect pre-determining the plurality of preferred system configurations includes pre-computing a plurality of locally optimal configurations. Herein "optimal" may mean, eg, from a system designer's or a system configurator's point of view "subjectively optimal". The system designer or the system configurator perceives the respective configuration as preferable over alternative configurations known, eg, to the system designer or to the system configurator. In an embodiment the subjectively optimal configuration is also objectively optimal. In an embodiment of the method according to the embodiment in the first aspect, pre-determining the plurality of preferred system configurations includes comprises computing parameters required to build such configurations. Herein "computing parameters" includes the meaning of computing a value of a pre-identified parameter.

In an embodiment the shared resource is provided as a communication coupling. In an embodiment the coupling is provided by a connection, in particular an electronic connection. In an embodiment the coupling is provided as a communication channel. The channel may be provided as a physical channel. The channel may be provided as a logical channel. The system may encompass a plurality of kinds of coupling. In an embodiment the sharing information relates to time sharing; in a particular embodiment the time sharing relates to use of the electronic communication connection in time sharing, for example, by one or more of the plurality of units in the system.

In a variant according to the embodiment in the first aspect, the method is for enhancing communication in a system with a plurality of communication connections. In an embodiment, the communication connections are provided as electronic communication connections. The method comprises pre-computing a plurality of locally optimal configurations. In an embodiment, "locally optimal" is determined in respect of a given criterion. In an embodiment, the method comprises pre-computing parameters required to build such configurations. The method comprises storing in a memory data about, as the case may be, the configurations and/or the parameters. The method comprises processing such data to create time sharing information. In an embodiment the method comprises conveying such time sharing information to communication units. At least one effect of the method according to the embodiment in the first aspect is that such communication units may transmit at such times and such power levels as to achieve enhanced communication within the system according to some criterion such as the predetermined criterion. At least one effect of the method according to the embodiment in the first aspect according to the variant is that such communication units may transmit at such times and such power levels as to achieve enhanced communication within the system according to some criterion such as the pre-determined criterion.

An embodiment according to the embodiment in the first aspect further comprises re-computing a plurality of locally optimal configurations and parameters required to build such configurations when a new communication unit is added to the system.

An embodiment according to the embodiment in the first aspect further comprises pre-computing a plurality of locally optimal configurations and parameters required to build such configurations where the communication units have guaranteed data rates and the locally optimal configurations meet or exceed those guaranteed data rates.

An embodiment according to the embodiment in the first aspect further comprises receiving information that one or more communication units is inactive at a particular time. An embodiment according to the embodiment in the first aspect further comprises receiving information that one or more communication units is requires less than a guaranteed data rate at a particular time. In an embodiment receiving the information includes information that the one or more communication units is either inactive or requires less than a guaranteed data rate at a particular time.

In an embodiment according to the embodiment in the first aspect the communication units comprise transceivers. In an embodiment according to the embodiment in the first aspect the communication units further comprise remote terminals.

In a second aspect the embodiment encompasses a central unit to form part of a communication system operative to serve multiple electronic communication lines. The central unit comprises means for receiving electronic data related to receiver channel characteristics. In an embodiment the means for receiving electronic data related to channel characteristics is an electronic receiver or an electronic transceiver.

In an embodiment according to the embodiment in the second aspect the central unit comprises an optimizer adapted to operate an optimization routine to compute multiple locally optimal configurations. In an embodiment the optimizer is further configured to identify locally optimal configuration points needed to reach desired data rates. In an embodiment the central unit comprises a memory configured to store data representative and/or indicative of the locally optimal configurations and locally optimal configuration points.

In an embodiment according to the embodiment in the second aspect the central unit comprises means for computing a media access plan. In particular, the media access plan to achieve optimal system communication according to a criterion. In an embodiment the criterion is one of selected from the group consisting of (i) a rule for absolute fairness; (ii) a rule for relative fairness; and (iii) a rule for maximizing the sum of all data rates. In an embodiment the media access plan comprises information about time slots, about when transceivers should transmit, and/or about the power levels at which transceivers should transmit. In an embodiment according to the embodiment in the second aspect the means for computing a media access plan to achieve optimal system communication according to a criterion are a data processing module within the central unit.

In one embodiment the central unit comprises means for conveying the media access plan to transceivers that will transmit in accordance with the plan. In an embodiment the means for conveying the media access plan is an electronic transmitter or an electronic transceiver.

In an embodiment the memory is adapted to store information about data rates guaranteed to various communication units. In an embodiment the electronic data about receiver channel characteristics comprises data about when a communication unit is inactive and/or data about when a communication unit requires less than its guaranteed rate. In an embodiment the means for computing a media access plan further comprises means to calculate locally optimal configurations and locally optimal parameters when all communication units are served with their guaranteed rates. In an embodiment the means for computing media access plan further comprises means to calculate different combinations of locally optimal configurations when one or more communication units are either in active or require less than their guaranteed rates. In an embodiment said different combinations include time sharing information to provide higher than guaranteed rates to some communication units at a time when one or more other communication units either are inactive or require less than their guaranteed rates.

In an embodiment according to the embodiment in the second aspect the central unit is adapted to perform one or more of the steps of the method according to the embodiment in the first aspect.

At least one effect of the embodiment in the second aspect is that the central unit when used in a communication system enables efficient use of communication channel bandwidth.

In a third aspect the embodiment encompasses a system operative to serve multiple electronic communication lines. The system comprises a distribution point. The distribution point comprises a central unit. In an embodiment the distribution point comprises a plurality of transceivers. The system further comprises a plurality of line interfaces and a crosstalk channel. In an embodiment the system is configured to compute locally optimal communication configurations, store in memory data about said configurations, process said data into time sharing information, and to convey such time sharing information to the transceivers. In an embodiment such transceivers at a point later than the conveyance of time sharing information to the transceivers transmit in accordance with such time sharing information.

In a variant of the system according to the embodiment in the third aspect the embodiment encompasses a system operative to serve multiple electronic communication lines. The system comprises a distribution point, a plurality of line interfaces, a crosstalk channel and a plurality of remote terminals. In an embodiment the distribution point comprises a central unit and a plurality of transceivers. In an embodiment the system is configured to compute locally optimal communication configurations, store in memory data about said configurations, process said data into time sharing information, convey such time sharing information to the transceivers and the remote terminals. In an embodiment such transceivers and/or remote terminals later transmit in accordance with such time sharing information.

In an embodiment according to the embodiment in the third aspect one or more, and in a particular embodiment, each of said plurality of transceivers comprises a front end and a line driver. In an embodiment the front end comprises a digital front end and/or an analog front end. In an embodiment according to the embodiment in the third aspect the number of front ends in the system is more than one and less than the number of line interfaces.

In an embodiment according to the embodiment in the third aspect the system is configured to switch all communication transmissions between the locally optimal communication configurations. In an embodiment according to the embodiment in the third aspect the system is adapted so that in any locally optimal communication configuration, the number of active transmission connections is between zero and the number of front ends, inclusive.

In an embodiment according to the embodiment in the third aspect the system is a wireline communication system. In an embodiment according to the embodiment in the third aspect the system is a wireless communication system. In an embodiment according to the embodiment in the third aspect the system is a hybrid communication system. In particular, the hybrid system includes a wireline communication and a wireless communication.

In an embodiment according to the embodiment in the third aspect each remote terminal has a guaranteed data for transmit from the terminal or for reception to the terminal or for both transmit and reception. In an embodiment the system is configured to calculate locally optimal configurations where the system serves all the guaranteed data rates to and from all remote terminals. In an embodiment the system is configured to adapt the locally optimal configurations to serve some remote terminals with higher than guaranteed data rates, when others of the remote terminals either are inactive or require less than their guaranteed rates.

In an embodiment of the system according to the embodiment in the third aspect the system is adapted to perform the method according to the embodiment in the first aspect. In an embodiment of the system according to the embodiment in the third aspect the system includes at least one central unit according to the embodiment in the second aspect.

In a fourth aspect the embodiment encompasses a method for use in a communication system. The method comprises generating, for transmission in a communication system including at least one transceiver, a superframe. The superframe includes a plurality of symbols. In an embodiments each symbol of the plurality of symbols forms part in a set of symbols. At least one set of symbols is allocated for upstream transmission and another set of symbols is allocated for downstream transmission. In an embodiment, the symbols allocated for upstream transmission have an associated time position for actual upstream transmission. In an embodiment, the symbols allocated for downstream transmission have an associated time position for actual downstream transmission. In an embodiment, the two associated time positions are different.

In a fifth aspect the embodiment encompasses a method for synchronization in a communication system. The method comprises generating at least one superframe that includes symbols designated for upstream and downstream communication and at least one sync symbol to align the superframe and provide timing for upstream and downstream symbol use. In an embodiment, the method comprises transmitting one or more pilot tones to enable clock synchronization and symbol synchronization. In an embodiment the transmission method comprises transmitting consecutive superframes, wherein no gap falls between the superframes. In an embodiment each superframe starts from a sync symbol followed by M symbol periods for data/management/control symbols. In an embodiment, each superframe is divided into groups of consecutive symbols. In an embodiment, each group is assigned for upstream or downstream transmission, wherein at least one or more sync symbols is transmitted in the downstream direction.

In a sixth aspect the embodiment encompasses a communication syncronization method. The method comprises aligning downstream sync symbols of lines connected to a communication system distribution point, aligning superframes of the lines connected to a communication system distribution point by way of the downstream sync symbols, aligned downstream and upstream symbols of lines connected to a communication system distribution point; and aligned upstream sync symbols (if used).

In a seventh aspect the embodiment encompasses a transmission scheduling method for use in a system having a distribution point and at least one remote terminal coupled to the distribution point via a transmission medium associated with the remote terminal. The method comprises providing a medium access plan for all transmission media, distribute the medium access plan to all of the distribution point and the remote terminal, and/or communicate between the distribution point and the remote terminal according to information comprised in the medium access plan.

In an embodiment the distribution point comprises at least one transceiver. In an embodiment the at least one transceiver in the distribution point is coupled via the communication medium to the at least one remote terminal, wherein the at least one remote terminal is associated with the at least one transceiver such that different remote terminals, in one embodiment, may be coupled to different transceivers in the distribution point. In one embodiment a selected plurality of remote terminals may be associated with a same transceiver in the distribution point and/or accordingly the selected plurality of remote terminals may be coupled to the same transceiver in the distribution point. In an embodiment the at least one remote terminal includes a transceiver for coupling to a corresponding transceiver via the transmission medium.

In an embodiment the media access plan includes a schedule of transmission for all transmission media connected to the distribution node. In an embodiment the medium access schedule is provided in terms of timing information. In an embodiment the medium access schedule is provided in terms of symbols. In an embodiment the medium access schedule is provided in terms of groups. In an embodiment the group comprises at least one symbol. In an embodiment the group is provided with a frame. In an embodiment the frame does not comprise any symbol. In an embodiment the frame does comprise a symbol. In an embodiment the symbol is to be transmitted. In an embodiment the symbol is to be received. In an embodiment communication according to information comprised in the medium access plan includes the distribution point, in particular the at least one transceiver in the distribution point, and/or the at least one remote terminal, in particular the transceiver in the at least one terminal, accessing the transmission medium in accordance with the medium access plan, in particular in accordance with timing information in the medium access plan. In an embodiment the medium access plan comprises information on when to access the transmission medium, who to access the transmission medium, and how to access the transmission medium. In an embodiment the information comprises information on when, who and/or how to send via the transmission medium. In an embodiment the information comprises information on when, who and/or how to receive via the transmission medium.

In an embodiment the distribution point is provided as a distribution node. In an embodiment the distribution node/point comprises a distribution unit. In an embodiment the distribution unit is provided as a central unit. In an embodiment the distribution node comprises at least one transmission unit. In an embodiment the transmission unit forms a portion of a transceiver. In an embodiment the transmission unit is coupled to the transmission media. In an embodiment the unit is provided as customer premises equipment (CPE).

In a eights aspect the embodiment encompasses a communication method, comprising aligning downstream transmissions over all transmission media by boundaries, aligning upstream transmissions over all lines by boundaries, and providing a medium access plan that includes one downstream and one upstream transmission, and a superframe that includes an integer number of upstream and downstream transmissions.

In a ninth aspect the embodiment encompasses a communication method for use in a system having a distribution point and at least one remote terminal coupled to the distribution point via a transmission medium associated with the remote terminal. The method comprises providing a medium access plan for all transmission media associated with the remote terminal, distribute the medium access plan to all of the distribution point and the remote terminal, and communicate between the distribution point and the remote terminal according to information comprised in the medium access plan. In an embodiment according to the embodiment in the ninth aspect providing the medium access plan comprises at least one in a group of: (i) pre-computing a plurality of locally optimal configurations and parameters required to build such configurations, (ii) storing in a memory data about the configurations and the parameters, (iii) processing such data to create time sharing information, and (iv) conveying such time sharing information to communication units so that such communication units may transmit at such times and such power levels as to achieve enhanced communication within the system according to some criterion. An embodiment according to the embodiment in the ninth aspect comprises aligning downstream transmissions over all transmission media, aligning upstream transmissions over all transmission media, and communicating according to the medium access plan. An embodiment of the method according to the embodiment in the ninth aspect further comprises ensuring pre-determined overlap between downstream and upstream transmissions over any two transmission media coupled to the distribution point, providing the medium access plan, wherein the medium access plan includes all downstream and upstream transmissions over all active transmission media, and ensuring that overall duration of upstream and downstream transmissions are equal or less than a number of symbols in a superframe. In an embodiment the pre-determined overlap is zero such that in this embodiment there is no overlap between downstream and upstream transmissions over any two transmission media coupled to the distribution point, providing the medium access plan.

In a tenth aspect the embodiment encompasses a transmission method between a DP and multiple CPEs that allows to connect the same CPEs to a first approach DP, or a second approach DP, and/or a combination of both wherein the combination solution uses TDD and STDMA for example in an alternate fashion. In an aspect the embodiment also encompasses a new hybrid solution including aspects of both TDD and STDMA.

In an embodiment the defined transmission concept is intended for serve for both in TDD and STDMA mode of operation of the DP.

In an embodiment the transmission process includes at least one of three phases:
    Initialization (upon data or management service request, includes synchronization and channel estimation);

Transmission (bi-directional data transport in assigned timeslots, including acknowledgements for received packets, at least if required);

Deactivation (upon termination of the service, CPE turns to inactive mode and requests re-initialization when new service is required by the user). In an embodiment one type of deactivation may be a transition to power-saving mode (like sleeping mode). At least one effect may be to allow fast re-initialization.

In an embodiment, pilot tones may be optionally transmitted from a DP to all CPEs. At least one effect of this embodiment may be to allow proper synchronization. Values of pilot tones may be assigned by the DP, for example, during the initialization, or in an embodiment also during operation. In an embodiment pilot tones, if used, may be transmitted continuously, in particular, in the downstream direction only (i.e., from the DP to the CPEs).

In an embodiment a transmission format is a superframe that includes a sync symbol followed by M data symbols. In an embodiment the value of M shall be selected based on synchronization issues. In one embodiment the expected duration of a superframe is about 20-60 ms. In an embodiment during initialization, additional transmission formats may be used. In an embodiment additional transmission media may be used. In an embodiment a first transmission medium is used for transmission of a first information such as a medium access plan, and a second transmission medium is used for communication in accordance with the medium access plan. In an embodiment a plurality of transmission media, for example, wireless, wireline, and/or powerline, are used for communication in accordance with the media access plan.

In an embodiment in a case of TDD, superframes in all active lines are aligned: sync-symbols are sent into all transmission media, e.g., lines simultaneously, and all other symbols in different lines are aligned in time (for vectoring purposes). In an embodiment in a case of STDMA, sync symbols are also broadcasted into all active lines, while data symbols are sent to only a single transmission medium, e.g., a line, at a time. In an embodiment data symbols are sent to a number of transmission media, wherein the number is selected between zero and the number of remote terminals coupled to the distribution point, inclusive.

Various embodiments are not restricted or constrained by the physical channel on which data is conveyed. Therefore, various embodiments are applicable, while other embodiments are wireline, telephone or other wireline communication, and other embodiments are wireless.

Various embodiments are not restricted or constrained by the manner in which a system or owned or operated. Therefore, various embodiments may be entirely owned and operated by a single entity. A private MIMO system, whether wireline or wireless, is one non-limiting example of such an embodiment, but various embodiments may apply to any private communication system. Other embodiments may involve a split of ownership or operation, in which, for example, a server system (including central unit, transceivers, and crosstalk channel) are operated by one entity while remote terminals are operated by another entity. Such other embodiments, which may be wireline or wireless in all their forms, are described herein as they apply separately to the server on the one hand, and the remote terminals on the other hand.

In this description, the following symbols have the indicated meanings:

$R_i$ means "Rate on connection i".

R means "Vector of rates of all communication connections".

$R_{sel}$ means "Selected rate vector", typically the rate vector that maximizes system communication according to any of the three alternative optimization criteria, although other rate vectors may be selected.

$R_{tj}$ means "Rate vector for time instance j".

u(R) means "Utility function", which the selected system-wide optimization factor.

$p_i$ means "Transmit power on connection i".

$p_{sel}$ means "Selected power vector", typically the power vector that will maximize system communication according to the selected optimization criterion, although other power vectors may be selected.

$t_j$ means "Percentage of time where configuration parameter set j is used".

$w_i$ means "Weighted sum-value weight value for connection i".

In this description, the following terms have the indicated meanings:

"Local optimization" is the process of finding transmission power levels for two communication units, and the corresponding data rate for each such unit. In local optimization, "locally optimal points" are the found power and data rate points, and the result is a "locally optimized configuration". Configurations may be computed for all rate allocations, and such configurations may be stored in communication units and in the central unit.

"Global optimization" is a process with two steps. First, local optimization is performed, as discussed above. Second, there may be provided in addition or in the alternative rapid switching between different multiple locally optimized configurations. This rapid switching allows an increase in the system performance over alternative embodiments by using the multiple locally optimized configuration. At any particular point in time, one such locally optimized configuration is being implemented. In "global optimization", there may be multiple local optimization configurations, and different local optimization configurations may be selected at different times in order to optimize communication performance at different points of time. Global optimization is implemented in various embodiments, which can improve the performance of the communication system.

"Dynamic rate adaptation" may be considered as a two step process. First, global optimization is performed, as discussed above. Second, as an alternative or in addition, an event happens to change the local optimizations. This creates a need to re-compute new local optimization configurations, using various algorithms which might include some kind of linear programming. The new local optimization configurations are then stored in communication units and in the central unit. Dynamic rate adaptation may be implemented in various embodiments, which may improve the performance of the communication system.

"Communication units" may include all any or all of the units that can act as receivers, or transmitters, or both. The central unit, the transceivers within the distribution point, and the remote terminals, may all be included within the term "communication units".

"Server side components" may be considered as the components of a system on the server side, including the central unit, the transceivers, and the crosstalk channel, but not including the remote terminals.

"Client side components" are all the components of a system on the client side, including the remote terminals and the part of the connection from the remote terminals to the crosstalk channel that is under the control of the operator or owner of the remote terminals. Client side components do not include server side components.

"Transceiver" may be considered a radio unit within a distribution point that is in communicative contact with a central unit, and which executes both electronic transmission and electronic reception. Electronic transmission may include wired and wireless transmission.

"Remote terminal" is a radio unit outside the distribution point. Although a remote terminal may be a transmitter, a receiver, or a transceiver, it is not referenced herein as a "transceiver", since the term "transceiver" applies to radio units within a distribution point.

"Wireline communication" includes communication by cable, by a pair or greater number of telephony lines bound together, or by any other communication that includes communication by cable or wire. A "wireline" is a line that is cable, wireline telephony, or any other kind of wired structure for communication. A "wireline communication" or "wireline connection" is the path by which wireline communication occurs.

"Wireless communication" includes communication by wireless, which may be terrestrial or satellite, cellular or land mobile, microwave or sub-microwave, or any other kind of wireless communication. A "wireless communication" or "wireless connection" is the path by which wireless communication occurs.

"Hybrid communication system" is a system that includes at least one wireline connection between two or more communication units, and also at least one wireless connection between two or more communication units.

"Mixed access system" is a system that includes two or more types of channel access, which may be, for example, TDMA, FDMA, CDMA, SDMA, TDD, or FDD.

FIG. 1 illustrates a multi-user transmission system according to an alternative embodiment. The central unit 110 manages the system, communicating directly with transceivers 120. The central unit 110 and the transceivers 120 together make up a distribution point 130. The central unit 110 may transmit to or receive from the transceivers 120. The transceivers 120 may transmit to either the central unit 110 or through the crosstalk channel 140 to the remote terminals 150, in which case the transceivers 120 are acting as transmitters. The transceivers 120 may receive from either the central unit 110 or through the crosstalk channel 140 from the remote terminals 150, in which case the transceivers 120 are acting as receivers. The remote terminals 150 may transmit through the crosstalk channel 140 to the transceiver 120, in which case the remote terminals 150 are acting as transmitters, or the remote terminals 150 may receive from the transceivers 120 through the crosstalk channel 140, in which case the remote terminals 150 are acting as receivers.

Figure 2:
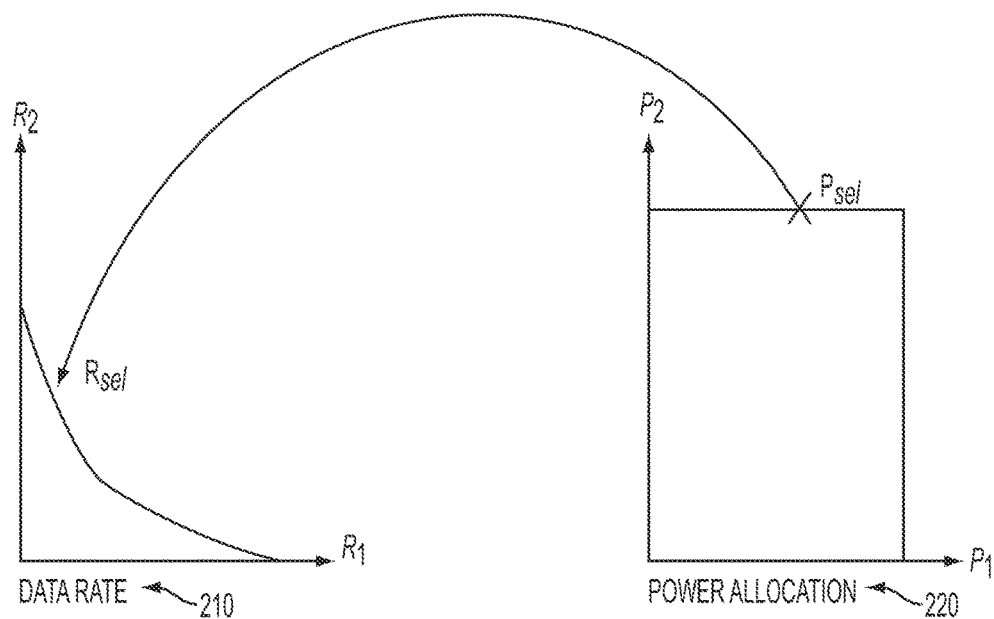
FIG. 2 illustrates a region of reachable data rates and powers for two lines that have strong crosstalk.

An operation of an alternative system is shown in FIG. 2, which illustrates a region of reachable data rates and powers for two lines that have strong crosstalk, according to the alternative embodiments. The transmission system consists of several transmission lines with crosstalk between them. Every transceiver 120 or remote terminal 150 is able to adjust some parameter of the physical link, such as a transmit power between 0 and $p_{max}$, continuously or in discrete steps. There is a mapping between the possible power allocation 220 for each transmission lines, described by a power vector p for power levels P1 and P2 in FIG. 2, and the reachable data rate 210 for each of the of the links R, shown as R1 and R2 in FIG. 2. The shape of the area of reachable data rates, which is "the rate region", is defined by the capabilities of the transmission system and the transmission channel as shown in the concave curve in the data rate 210. The shape of the area of the reachable power levels is shown in the four-point box in the power allocation 220. FIG. 2 shows the power levels and data rates which have been selected by this system, in which Psel shows maximum power level to P2 and sub-maximum power level to P1, and which the corresponding data rate, Rsel, shows sub-maximum data rates for each of R1 and R2.

Figure 3:
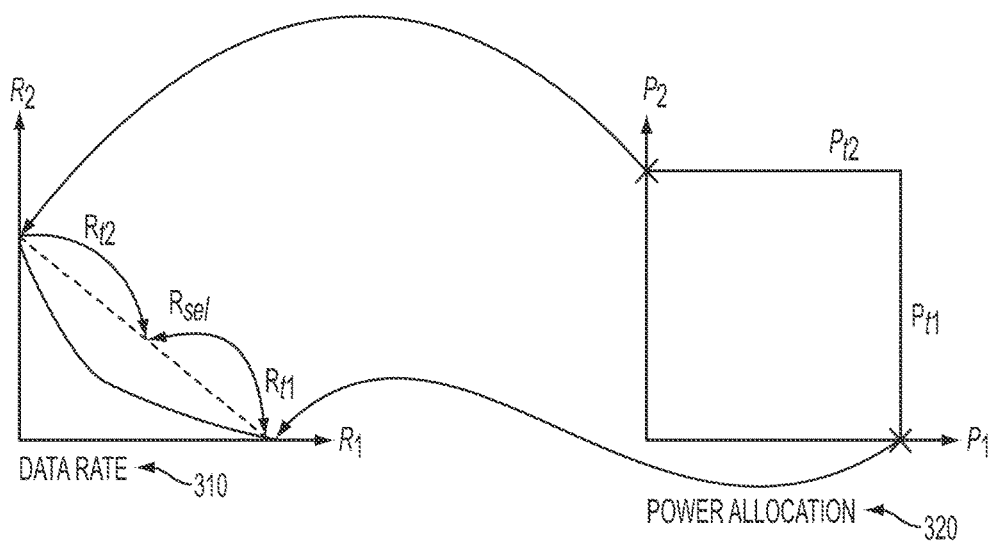
FIG. 3 illustrates one embodiment of a region reachable data rates and powers for two lines that have strong crosstalk and communication time sharing.

Turning now to the embodiments provided herein, FIG. 3 shows rates that may be achieved. FIG. 3 illustrates regions of reachable data rates and power levels for two lines that have strong cross talk. Power allocation 320 is shown at the right, and data rate 310 at the left. Again, the maximum achievable data rates are shown by the concave line in 310, and the maximum power rates are shown by the box in 320. Two pairs of points are shown, where P1 corresponds to Rt1, and P2 corresponds to Rt2. The first step, where locally optimal points are calculated, is shown in FIG. 3, where the configuration of full power to P1 and 0 power to P2 corresponds to maximum data rate for Rt1 and 0 data rate for Rt2, and 0 power to P1 and full power to P2 corresponds to 0 data rate for Rt1 and maximum data rate for Rt2.

Figure 5:
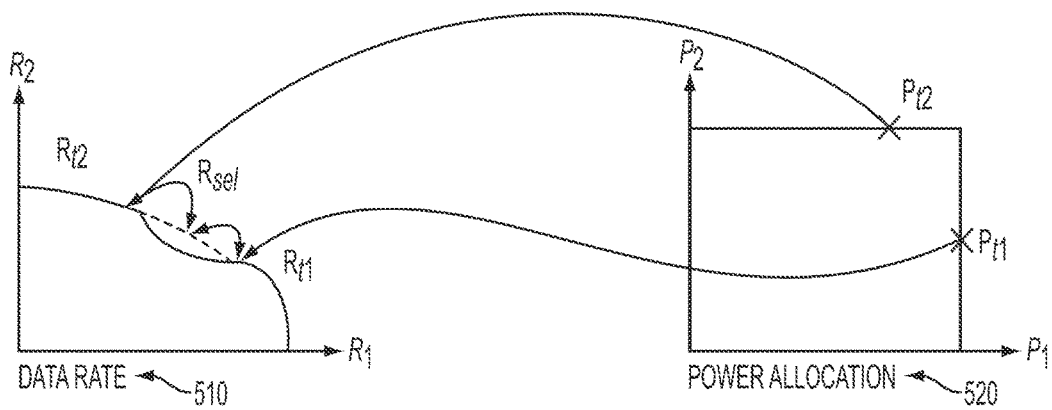
FIG. 5 illustrates one embodiment of a region of reachable rates and powers in a general case with two lines.

FIG. 3 shows that the former constraint on data rates, which was represented by the concave line in 210 in FIG. 2, is exceeded in the embodiments of FIG. 3. The two optimal configurations tested are maximum power to P1 and 0 power to P2, and maximum power to P2 and 0 power to P1. By switching between these two optimal configurations, various embodiments can achieve maximum data rate for any unit that is transmitting at any particular time. Therefore, the rates reached by the optimal combinations are always equal or higher than the rates reached by the original configuration, Psel and Rsel, shown in the figure. This holds true also for practical cases of rate regions, as is shown in FIG. 5, explained below.

In one aspect, the system first calculates optimal points at setup. These are points at which only one of the links is active. The system does this for one or more, and alternatively each active link. The system then calculates locally optimal points for two or more active links. For every configuration, there is a rate vector $R_i=f(p)$. In one exemplary embodiment, $R_1=f(p_1,p_2=0)$, $R_2=f(p_1=0,p_2)$ and $R_3=f(p_1,p_2)$. The power vectors achieving this points are $P_{t1}=(p_1=p_{max},p_2=0)$, $p_{t2}=(p_1=0,p_2=p_{max})$ and $p_{t3}=(p_1=0,p_2=p_{max})$ In the example, pt3 is the same as pt2, so pt3 is ignored as a possible separate implementation. The achievable rates for any combination of the points are $t_1R_1+t_2R_2$, where $t_1$ is the percentage of time where configuration 1 is used and $t_2$ is the percentage time where configuration 2 is used. The optimization of the two weights $t_1,t_2$ is solved by a linear program.

Embodiments illustrated in FIG. 3 may operate on any system, including, without limitation, any cable, wireline telephony, other wireline, wireless system, or hybrids of any of the aforementioned kinds of systems. Various embodiments are private systems in which all of the hardware components, both server side and client side, are owned and operated by a single entity. Various embodiments are private or public systems in which the server side components are owned and operated by a single entity, while the client side components are owned and operated by one or more different entities that do not own and operate the server side components. When there is a split between ownership and operation of the server side and client side components, the description herein related to various server side components and operations will apply only to the server side, and the description herein related to various client side components and operations will apply only to the client side.

Figure 4:
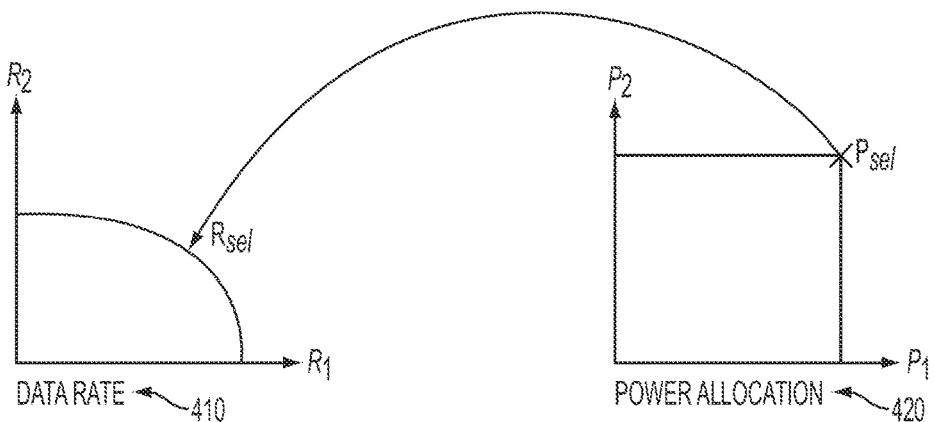
FIG. 4 illustrates a region of reachable data rates and powers for two lines that have weak crosstalk.

FIG. 4 illustrates a region of reachable data rates and powers for two lines that have weak crosstalk, according to alternative embodiments. Power allocation 420 corresponds with data rate 410. Since the two lines have little or no crosstalk or other co-channel interference, power transmission may be maximized for both P1 and P2, shown as Psel in 420. This power transmission configuration corresponds to maximum data rate for both R1 and R2, shown as Rsel in 410. The lines essentially operate independently, because their transmissions do not affect one another. FIG. 4 shows a convex rate region, because there is little crosstalk between the two lines. Weighted sum-rate optimal points are achievable when every link is optimizing locally, while only the weights $w_i$ of the links are coordinated from the central unit 110. Weighted sum-rate optimal algorithms like iterative water filling are able to reach the shown points.

FIG. 5 illustrates one embodiment of a region of reachable rates and powers in a general case with two lines. In this case, there is crosstalk between the two lines. Power allocation 520 corresponds with data rate 510. At one locally optimal point, power level Pt1 is maximum power to P1 and sub-maximum power P2, corresponding to point Rt1, which is sub-maximum data rate to both R1 and R2. In a second locally optimal point, power level Pt2 is maximum power to P2 and sub-maximum power to P1, corresponding to point Rt2, which is sub-maximum data rate to both R1 and R2. In various embodiments, multiple locally optimal points are stored in the memory of the communication units. Thus, global optimization may be achieved, thereby enhancing system performance. Performance may be enhanced in any system in which there are two or more communication lines, provided that at least two of such communication lines have strong crosstalk or other co-channel interference.

A system implementing various embodiments provided herein are capable of calculating the rates reached at points of interest in the transmission system. In the example shown in FIG. 3, to take only one instance, there are three possible configurations and two different locally optimal rates. Data related to configurations and rates is collected in the transceivers and remote terminals by proper link configuration, and then transmitted to the central unit. At system startup, at least one or typically each communication link checks the link quality for the case where all of the other links are quiet, and also checks link quality for the case where all the links are active. Optionally, other cases, where some of the links active, while others are not, may also be checked.

Given the data, locally optimized configurations are calculated by the central unit. If channel estimation data is also available, that data may also be sent to the central unit to calculate the rate points of interest from the estimation. When the system has many transmission links, additional sources of information, including estimation data, helps the central unit quickly calculate the locally optimized configurations.

Embodiments illustrated in FIG. 5 may operate on any system, including, without limitation, any cable, wireline telephony, other wireline, wireless system, or hybrids of any of the aforementioned kinds of systems. Various embodiments are private systems in which all of the hardware components, both server side and client side, are owned and operated by a single entity. Various embodiments are private or public systems in which the server side components are owned and operated by a single entity, while the client side components are owned and operated by one or more different entities that do not own and operate the server side components. When there is a split between ownership and operation of the server side and client side components, the description herein related to various server side components and operations will apply only to the server side, and the description herein related to various client side components and operations will apply only to the client side.

Figure 6A:
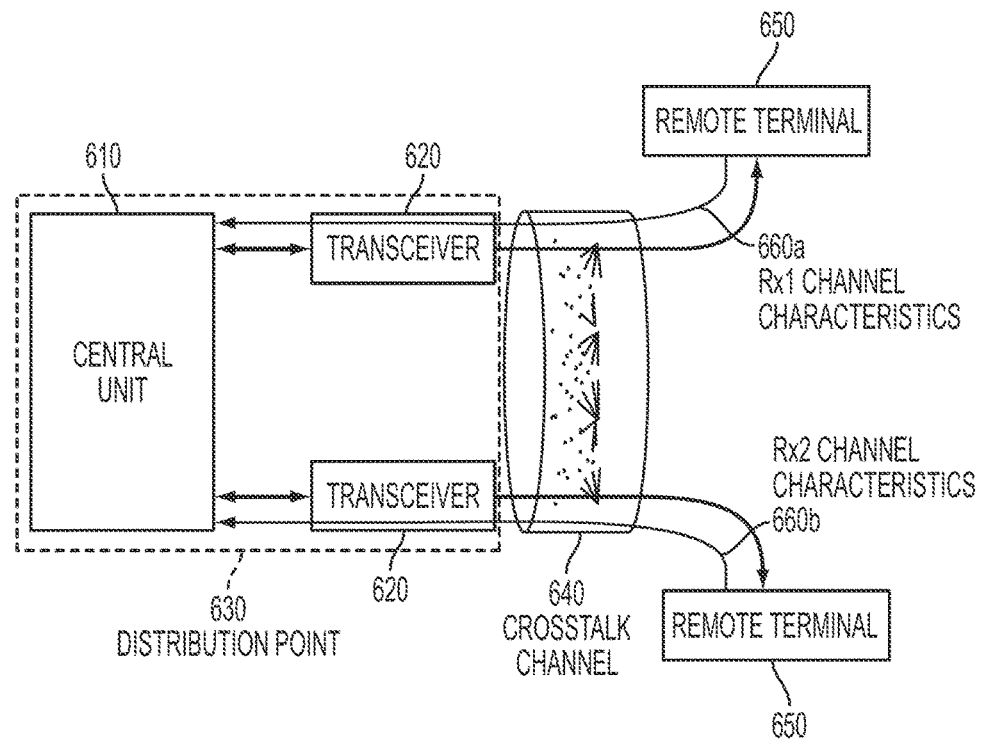
FIG. 6A illustrates one embodiment of a system with messaging for channel characteristics.
Figure 6B:
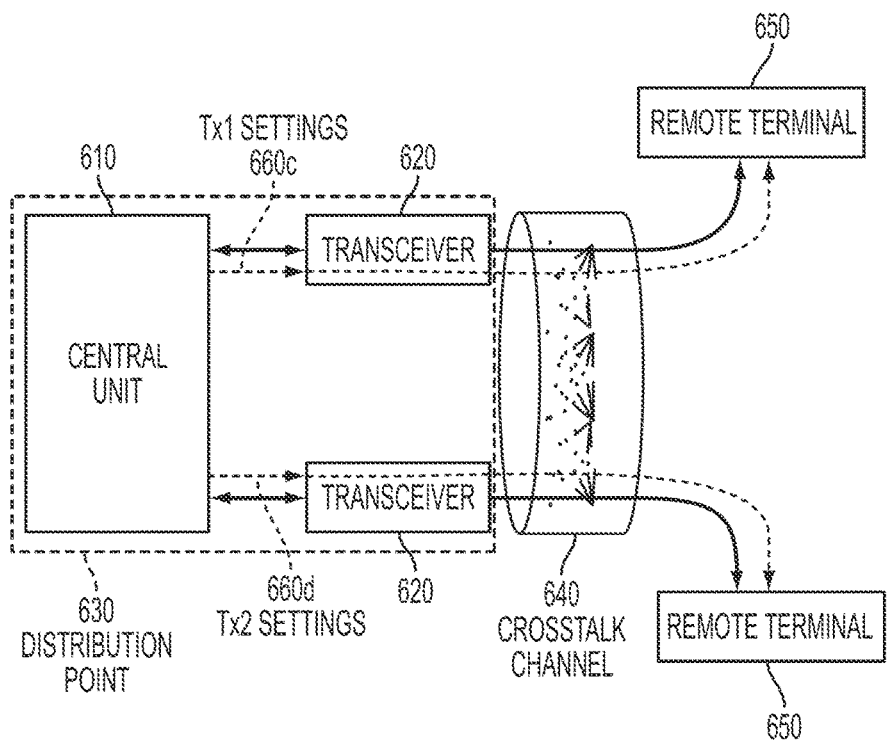
FIG. 6B illustrates one embodiment of a system with messaging for transmitter configuration settings.
Figure 6C:
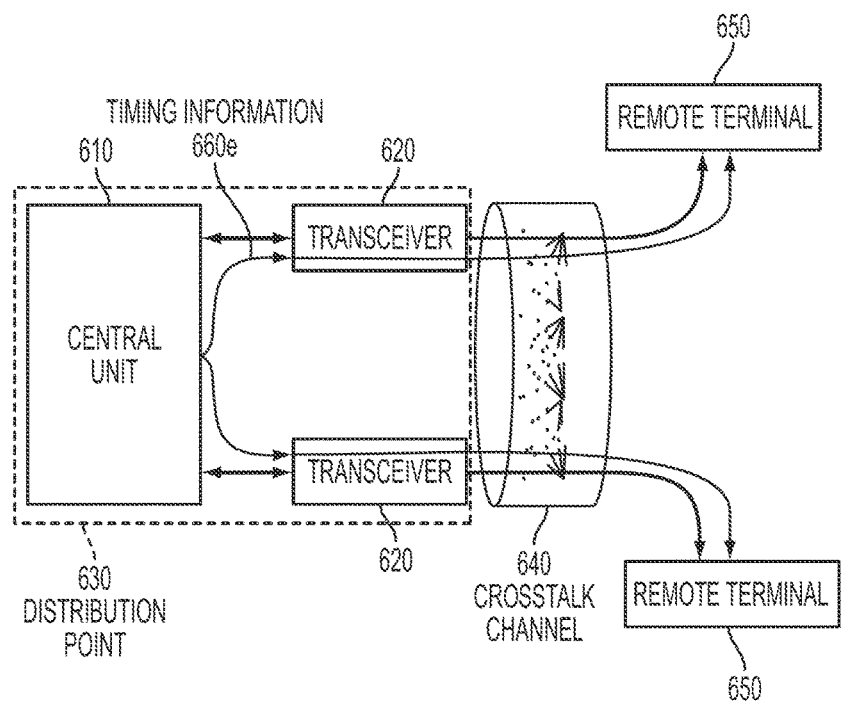
FIG. 6C illustrates one embodiment of a system with messaging for timing information.

One embodiment of structure implementing these functions is set forth in figures FIG. 6A, FIG. 6B, and FIG. 6C. All of these figures include a central unit 610 calculating the locally optimized configurations, transceivers 620 transmitting and receiving various data or information as further described, a distribution point including both the central unit 610 and the transceivers 620, remote terminals 650 that communicate with the transceivers 620, a crosstalk channel 640 through which communication flows in both directions between the transceivers 620 and the remote terminals 650.

Although each of FIG. 6A, FIG. 6B, and FIG. 6C, shows only two transceivers 620, it will be understood that there may be three, four, or any other higher number of transceivers in the system. Although each of the three figures shows only two remote terminals 650, it will be understood that there may be three, four, or any other higher number of remote terminals in the system.

Computation of locally optimized configurations is performed in the central unit 610. The central unit 610 may have specific structure, called an "optimizer", which runs an optimization routine and identifies a subset of configuration points that is needed to reach the desired rates. For example, in FIG. 3, there are the two points where only one transmitter is using the full power, whereas the point of two transmitters active at the same time is not needed. Thus, in FIG. 3, the "subset of configuration points" needed to reach a desired rate is two. The number of points necessary to reach the optimal point is always lower or equal to the number of lines. The running of an optimization routine may occur in a specific an dedicated part of the central unit 610, or in a distributed processing system with central unit 610 which can run the routine but which is not dedicated to that task, or in a unit totally separate from the central unit 610 which then shares the results with the central unit 610, or in any other matter permitted and enabled by technology to receive and process electronic data.

FIG. 6A illustrates one embodiment of a system with messaging for channel characteristics. In FIG. 6A, receiver ("Rx") channel characteristics are communicated to the central unit 610. Rx1 channel characteristics 660a is the virtual channel on which channel characteristic data is communicated from each remote terminal 650 at the top through the crosstalk channel 640, to the top transceiver 620, then to the central unit 610. 660a is also the virtual channel by which top transceiver 620 communicates its own Rx channel characteristics to the central unit 610. "Virtual channel" means that this is the flow of data, although the data may or may not be running on one or more particular physical channels between the central unit 660 the top transceiver 620, through the crosstalk channel 640, then to the top remote terminal 650. Rx1 channel characteristics 660b is the virtual channel on which channel characteristic data is communicated from each remote terminal 650 at the bottom through the crosstalk channel 640, to the bottom transceiver 620, then to the central unit 610. 660a is also the virtual channel by which bottom transceiver 620 communicates its own Rx channel characteristics to the central unit 610. "Virtual channel" means that this is the flow of data, although the data may or may not be running on one or more particular physical channels between the central unit 660 the bottom transceiver 620, through the crosstalk channel 640, then to the bottom remote terminal 650.

The data communicated as part of the Rx channel characteristics may include any kind of data that impacts the desired reception of data at the various transceivers and remote terminals. It may include technical data, such as crosstalk between channels, electro-magnetic (EM) interference of any other kind that may affect reception, and any limitations on ability of the transceivers or remote terminals to receive data. It may include relevant customer data, since the anticipated quantity, required quality, and timing, of data to be received at a remote terminal, or the amount of compensation customers are prepared to pay for ensuring the reception of certain quantity, quality, or timing, of data.

After the central unit 610 has received Rx channel characteristic data from the transceivers and remote terminals, it computes locally optimal configurations, and communicates necessary data to the transceivers 620 and remote terminals 650. Such data will include at least transmitter configuration settings for any locally optimal configuration, which means at least the power levels of transmission for each of the transceivers 620 and remote terminals 650.

FIG. 6B illustrates one embodiment of system with messaging for transmitter configuration settings. As shown in FIG. 6B by the dotted line extending out from top of central unit 610, transmitter configuration settings are communicated on virtual channel 660*c* from the central unit 610, to top transceiver 620, through crosstalk channel 640, to remote terminal 650. As shown in FIG. 6*b* by the dotted line extending out from the bottom of central unit 610, transmitter configuration settings are communicated on virtual channel 660*d* from the bottom of central unit 610, to bottom transceiver 620, through crosstalk channel 640, to bottom remote terminal 650.

FIG. 6C illustrates one embodiment of a system with messaging for timing information. In FIG. 6C, two lines go out from the center of central unit 610. Each line shows the communication of timing information from the central unit 610. For the line at the top, timing information is sent on the top line directly to top transceiver 620 and also to top remote terminal 650 through top transceiver 620, crosstalk channel 640, and then to top remote terminal 650. For the line at the bottom, timing information is sent on the bottom line directly to bottom transceiver 620 and also to bottom remote terminal 650 through bottom transceiver 620, crosstalk channel 640, and then to bottom remote terminal 650. The lines go out from the same point of central unit 610 in order to illustrate, and emphasize, that all of the units, that is, all of the transceivers, and all of the remote terminals, receive coordinated timing information, in which the time slots are the same for all of the transmitting units, and each unit will transmit in accordance with the plan calculated by the central unit 610. Synchronization of transmission is typically required in order to optimize the performance of the communication system. With the Rx channel characteristic data in FIG. 6A, it is not necessarily required that all of the data be communicated at the same time to the central unit 610, and each unit, be it transceiver or remote terminal, may have its own unique Rx channel characteristics that differ from the characteristics of one or more other transceivers or remote terminals. Similarly, the transmitter configuration settings in FIG. 6B need not be communicated at the same time to the various transceivers and remote terminals, and each such transceiver or remote terminal may have its own unique transmitter configuration setting different from the settings of all the other transceivers and remote terminals.

In some embodiments, the timing configuration settings communicated in FIG. 6C need not be communicated to all of the transceivers and remote terminals at the same time. These are embodiments related to initial system set up, or where timing of a new setup is not critical. In other embodiments, the timing configuration settings are communicated substantially simultaneously or at the same time from the central unit 610 to the transceivers 620 and remote terminals 650. Substantially simultaneous or at the same time communication may be necessary in dynamic rate adaptation, in order to allow the system to very quickly calculate, store, and implement, new locally optimal configurations, in response to changing Rx channel characteristics, thus optimizing system performance in embodiments where speed of adaptation is important.

To be able switch between different configurations, the reference parameters of the configurations of interest are distributed to the transmitters and receivers of the system. Various embodiments include configuration messages which distribute the parameters, and which enable the transceivers and remote terminals to store multiple configurations locally. Additionally, the transceivers and remote terminals are synchronized, so that they switch to the desired configuration at the same time. This is particularly useful in embodiments that include dynamic rate adaptation.

A media access plan message contains the information about what configuration is to be used at which particular time. Any single transceiver or remote terminal does not need to receive and store all parameters of the system, but only the subset that are connected to that specific link. For example, a transceiver or remote terminal acting as transmitter 1 will receive information to use full power $p_{max}$ for time $t_1$ and to be quiet at $t_2$. A transceiver or remote terminal may be acting as receiver 1 at the same time, in which case it may need to know the same times $t_1$ and $t_2$, but would not need to know the transmit powers (because it is not transmitting at time 1). Receiver 1 may need to switch receiver settings according to the media access plan, but still would need know the transmit powers at a time when the unit is receiving rather than transmitting. accordingly.

The transmitter and receiver configuration parameters may include pre-coding coefficients, bit loading, channel code settings, and other parameters.

Timing blocks, for transmission and reception, may be of a standard length, or may vary in length, as long as all each communication unit is aware of its part of the media access plan.

Transmitters with strong crosstalk will generally not transmit at the same time. Given two transmitters 1 and 2 with strong crosstalk, it is possible to allocate transmission time 50% to transmitter 1 and 50% to transmitter 2, but this is not particularly required, and a majority of time, in any percentage, may be allocate to the two transmitters, provided, of course, that the total transmission time of these two units does not exceed 100% of available time.

Embodiments illustrated in FIG. 6A, FIG. 6B, and FIG. 6C may operate on any system, including, without limitation, any cable, wireline telephony, other wireline, wireless system, or hybrids of any of the aforementioned kinds of systems. Various embodiments may be private systems in which all of the hardware components, both server side and client side, are owned and operated by a single entity. Various embodiments may be private or public systems in which the server side components are owned and operated by a single entity, while the client side components are owned and operated by one or more different entities that do not own and operate the server side components. When there is a split between ownership and operation of the server side and client side components, the embodiments provided herein may be related to various server side components and operations will apply only to the server side, and the embodiments herein related to various client side components and operations will apply only to the client side.

Advantages of the instant embodiments are afforded and are to be appreciated. A much greater degree of freedom for optimizing system settings may be afforded. Higher system performance is possible in systems that have two or more lines with strong crosstalk. Dynamic rate adaptation is further possible.

In addition, various embodiments allow the achievement of superior system performance, but with a reduced quantity of hardware. Reduction of hardware will reduce capital costs, may reduce operating costs (for leasing space, or for electricity costs, for example), and may reduce maintenance costs. One example of reducing hardware is that of reducing the number of transceivers at the distribution point. Power consumption is one of the limiting factors for high speed communication distribution points, and a major part of the overall power is consumed by the frontend electronics and line drivers. Therefore, in an aspect herein the embodiments advantageously reduce the number of frontends to a value less than the number of served lines.

Figure 7:
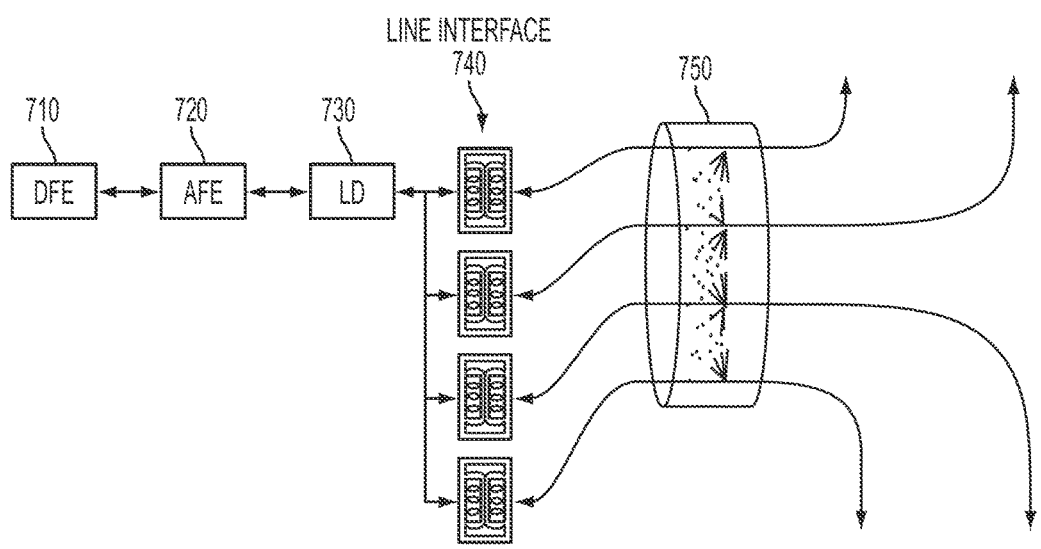
FIG. 7 illustrates a block diagram of a TDMA system.
Figure 8:
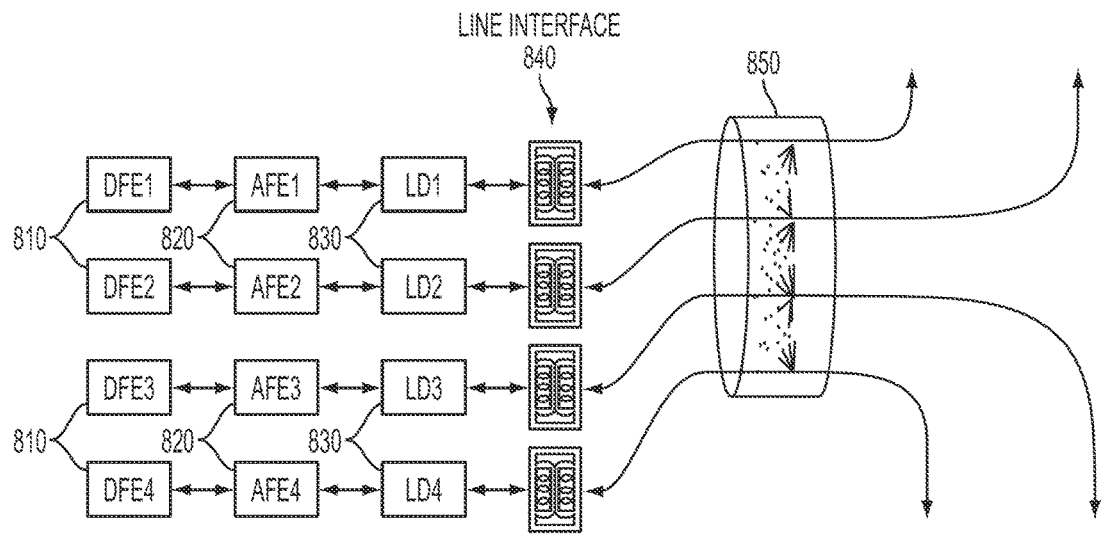
FIG. 8 illustrates a block diagram of a TDD system.

Two corner cases are the case of one transmitter for all lines. One corner case is shown in FIG. 7, which shows one transmitter for all lines. A second corner case is one transmitter per line, which is shown in FIG. 8, a block diagram of a alternative embodiments TDD system.

Figure 9:
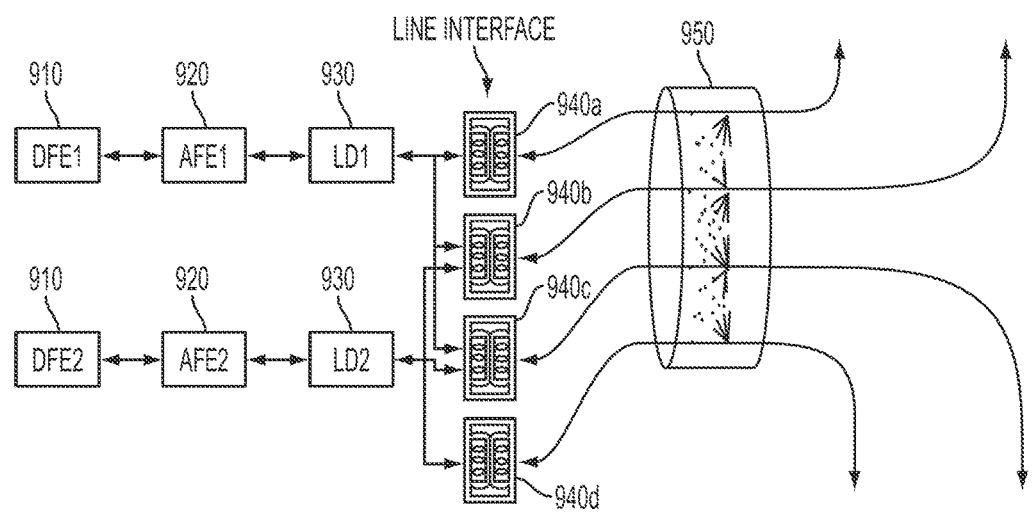
FIG. 9 illustrates one embodiment of a system with mixed access communication.

In various embodiments, there is an intermediate case between TDMA and TDD, which is a mixed access system, as shown in FIG. 9, which is just one example of very many kinds of mixed access systems that may be implemented in various embodiments.

A goal is to allow various described optimization routines to find configurations that serve all lines according to the quality defined by the optimization criterion. At the same time, the quantity of hardware is to be reduced.

FIG. 7 is a block diagram of a TDMA system to illustrate the efficacy of the instant embodiments. The term "DFE" 710 refers to the digital front-end, "AFE" 720 refers to the analog front-end, and "LD" 730 is a line driver. There is a line interface 740, which handles decoupling between line driver 730 and transmission line, impedance matching, and line termination. Also shown is a crosstalk channel 750, through which flows communication to and from remote terminals that are not shown. FIG. 8 is an example of a standard TDMA system.

FIG. 8 is a block diagram of a TDD system to illustrate the efficacy of the instant embodiments. DFE 810 communicates with AFE 820, which communicates with LD 830, which communicates with line interface 840, which communicates through crosstalk channel 850 with remote terminals not shown. Each communication chain is essentially separate. In FIG. 9, four chains are shown, marked 1, 2, 3 and 4, each chain including a DFE, an AFE, and LD, a line interface, and the crosstalk channel. This standard TDD system will work, but it requires a very heavy amount of hardware.

FIG. 9 illustrates one embodiment of a system with mixed access communication that has certain features of a TDMA system and certain features of a TDD system. This is a system with reduced complexity, and hence reduced hardware, with regard to alternative embodiments systems. Multiple connections may share one communication chain of a DFE, an AFE, and an LD. In order to do this, there may be stored, possibly at the DFE, but potentially at either the AFE or at the central unit to which the DFE is connected, multiple local optimized configurations and parameters for such configurations.

In one embodiment presented in FIG. 9, there are two communication chains, 1 and 2, in which each chain includes a DFE 910, an AFE 910, and an LD 830. The two chains may act independently. In this embodiment, the two chains can service four line interfaces to four remote terminals not shown (or to four groups of remote terminals, not shown). In this embodiment, one possible variation, not shown, would be to have each of the communication chains connect physically to each of the four line interfaces 940a, 940b, 940c, and 940d. Such a variation would work, but it would require more connections than is necessary.

The variation of a first embodiment shown in FIG. 9 shows only three connections between each communication chain and the line interfaces 940. Chain 1 is connected to line interfaces 940a, 940b, and 940c, but not to 940d. Chain 2 is connected to line interfaces 940b, 940c, and 940d, but not to 940a. The overall goal is to ensure that no two lines having strong crosstalk will be permitted to transmit at the same time, while reducing the number of active links. For this purpose, the variation shown is sufficient. If the crosstalk is between 940a and 940b, both lines may transmit at the same time, provided that 940a transmits with chain 1, and 940b transmits with chain 2. Similarly, if 940a and 940c have strong crosstalk, 940a may transmit with chain 1, and 940c may transmit with chain 2. Similarly, if 940a and 940d have strong crosstalk, 940a may transmit with chain 1, and 940d may transmit with chain 2. If 940b and 940c have strong crosstalk, they may both transmit at the same time, provided either one is transmitting on chain 1 and the other one is transmitting on chain 2. If 940b and 940d have strong crosstalk, 940b may transmit with chain 1 and 940d may transmit with chain 2. If 940c and 940d have strong crosstalk, 940c may transmit with chain 1 and 940d may transmit with chain 2.

With four line interfaces as shown, the system will work successfully by employing two communication chains and three connections between the chains and the line interfaces. Mathematically, with two communication chains, the minimum number of connections that may be required between the chains and the line interfaces, for the system to operate in the way described, is the number of line interfaces minus one. This number of line interfaces minus one, reduces the number of connections, hence the complexity of the system, and the cost, to a minimum.

Embodiments illustrated in FIG. 9 may operate on any system, including, without limitation, any cable, wireline telephony, other wireline, wireless system, or hybrids of any of the aforementioned kinds of systems. Various embodiments may be private systems in which all of the hardware components, both server side and client side, are owned and operated by a single entity. Various embodiments may further be private or public systems in which the server side components are owned and operated by a single entity, while the client side components are owned and operated by one or more different entities that do not own and operate the server side components. When there is a split between ownership and operation of the server side and client side components, the embodiments provided herein relate to various server side components and operations will apply only to the server side, and the embodiments herein relate to various client side components and operations will apply only to the client side.

Various embodiments operate in "single duplex mode", which means that the uplink and downlink transmissions are on the same channel, but in different time slots. In such a mode, communication units, also operating in single duple, transmit at any one time in either uplink or downlink. To reduce hardware complexity and cost, parts of the communication unit hardware are shared for uplink and downlink transmission. Although sharing reduces complexity and cost, it also has a disadvantage in that turnaround time is required to switch between uplink and downlink, and vice versa. Turnaround time reduces the rate efficiency.

Figure 10:
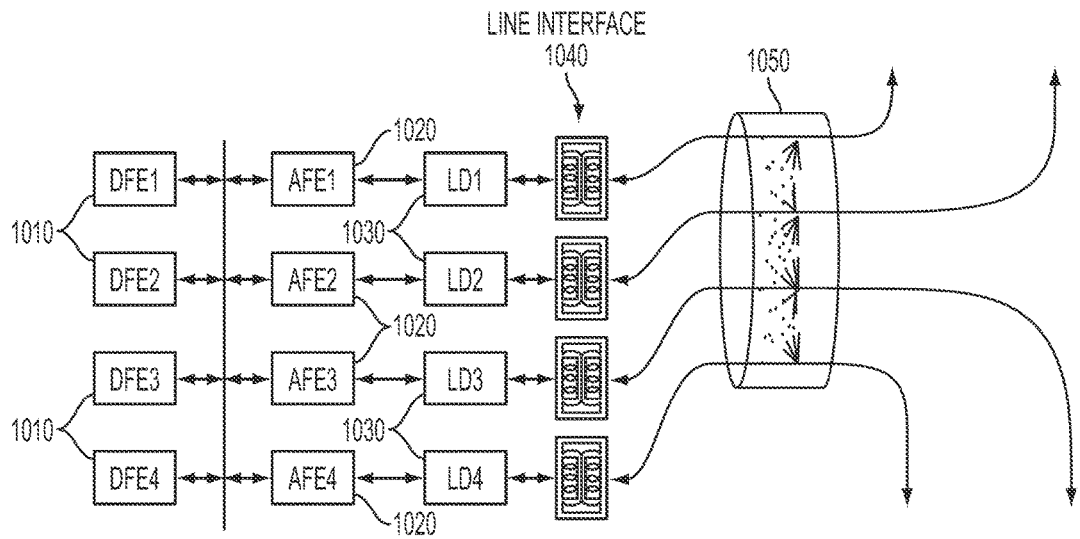
FIG. 10 illustrates one embodiment of a TDD system with additional interface between a digital frontend and an analog frontend.

It is possible to reduce the overhead due to this switching time. This may be done by the addition of a bus system between the DFEs and the AFEs, as shown in FIG. 10. FIG. 10 illustrates one embodiment of a TDD system with an additional interface between a digital frontend and an analog frontend. FIG. 10 is a block diagram of a TDD system with the addition of a bus system interface between the DFEs and the AFEs. In FIG. 10, there are four communication chains, each chain including a DFE 1010, an AFE 1020, and LD 1030, a line interface 1040, and the crosstalk channel 1050 connecting to one or a group of remote terminals, not shown. There is now a bus system, shown at the left, between the DFEs and the AFEs. One advantage of this system is that transmitting switches between different configurations in different time slots, and not all the transmitters are active in every time slot, similar to what is illustrated in FIG. 3. One benefit of this system in FIG. 10 is that time slots may be arranged such that where a chain is not required to transmit during a particular time slot, the chain may switch from transmit to receive (or vice versa) during that time slot. Doing this with multiple front ends, where not all the front ends are actively transmitting at the same time, is beneficial. Such benefit is enhanced where the system can insure, by way of a bus system, that at any time slot at least some of the DFEs may be switching their mode, while other DFEs can operate to make sure that all transmissions are occurring in accordance with media access plan.

There are additional advantages of the bus system of the bus system interface. With this interface, any communication chain, such as chain 1, can use any of the DFEs, such as DFE2, or DFE3, or DFE4, as shown. If DFE1 is out of service, for maintenance or for any other reason, the remainder of the chain, AFE1 and LD1, may be served by any of the other DFEs, provided that the DFE in use has in memory (or has access to the memory of the central unit or another piece of hardware) all necessary information about locally optimized configurations and their parameters. If system activity is low, a particular DFE is not necessarily required and is therefore inactive. In such case, one of the other DFEs can interface with its own chain and with the chain of the inactive DFE. All of these various embodiments are suggested by the cross-bar system shown in FIG. 10.

Embodiments illustrated in FIG. 10 may operate on any system, including, without limitation, any cable, wireline telephony, other wireline, wireless system, or hybrids of any of the aforementioned kinds of systems. Various embodiments are private systems in which all of the hardware components, both server side and client side, are owned and operated by a single entity. Various embodiments are private or public systems in which the server side components are owned and operated by a single entity, while the client side components are owned and operated by one or more different entities that do not own and operate the server side components. When there is a split between ownership and operation of the server side and client side components, the embodiments herein relate to various server side components and operations will apply only to the server side, and the embodiments herein relate to various client side components and operations will apply only to the client side.

Figure 11:
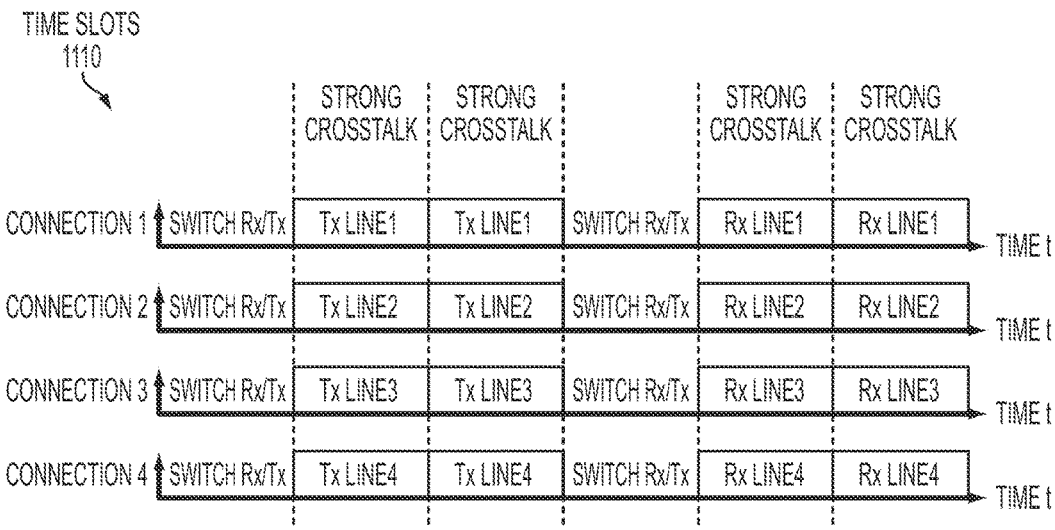
FIG. 11 illustrates one embodiment of an allocation of time slots for uplink and downlink transmissions in a TDD system.
Figure 12:
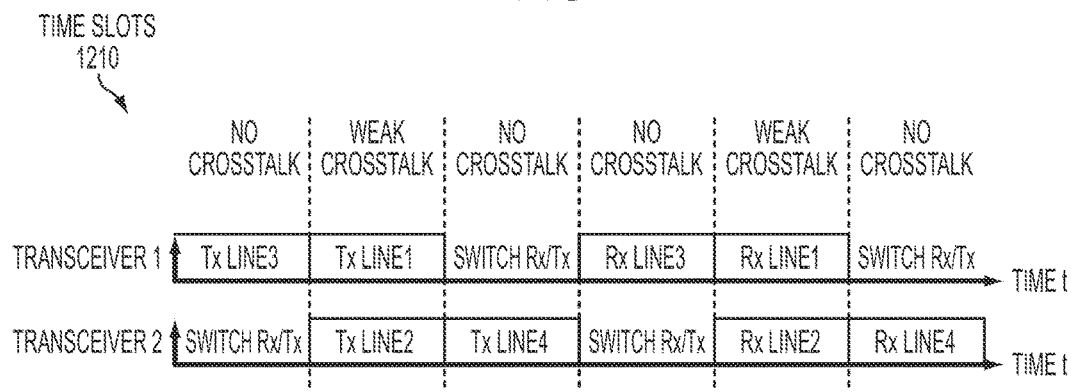
FIG. 12 illustrates one embodiment of an allocation of time slots for uplink and downlink transmissions in a mixed access system.

The system of time slots associated with the structure illustrated in the embodiment of FIG. 10, is illustrated in the FIG. 11 and FIG. 12. FIG. 11 is an illustration of a possible allocation of time slots 1110 for uplink and downlink transmission in TDD system, according to the alternative embodiments. FIG. 12 is an illustration, according to various embodiments, of a possible allocation of time slots 1210 for uplink and downlink transmission in a mixed access system.

FIG. 11 illustrates one embodiment of an allocation of time slots for uplink and downlink transmissions in a TDD system, according to the alternative embodiments. In FIG. 11, there are time slots in which all the lines do downlink transmission and the distribution point transceivers are in the transmit ("Tx") mode. There is then a switching time for all the lines. After the switching time, all the lines have switched to uplink, and the distribution point is in receive ("Rx") mode. Although various lines have strong crosstalk, this is not a problem, because each line has its own connections, which means that each line has its own communication chain. This would be like showing FIG. 10 minus the bus system interface.

FIG. 12 illustrates one embodiment of an allocation of time slots for uplink and downlink transmissions in a mixed access system. FIG. 12 shows to time slotting when the bus system interface is in place and active. FIG. 12 therefore shows various embodiments. For FIG. 12, assume a channel with four lines, where lines 1 and 2 experience only weak crosstalk, while lines 3 and 4 experience strong crosstalk. Assume further a setup with reduced hardware complexity and two transceivers, such as is shown in FIG. 9. The optimization routine will switch to a configuration where line 1 and line 2 are served in the same time slot, as there is only weak crosstalk. Line 3 transmission is served in another time slot than the transmissions of line 1 and line 2, and line 4 transmission is served in another time slot different from the transmission time slots for either line 3 or for lines 1 and 2. As shown in FIG. 12, there are time slots where only one transmitter may be needed, and in such time slots, the other communication unit may switch from transmit to receive configuration, or vice versa. If there is a bus system addition, as suggested, then one DFE can enable all the transmissions shown in FIG. 12, which means that another DFE can be in switch mode, and there will not be any effect on the effective communication rate of the entire system.

One of the general concepts shown in FIG. 12 is that crosstalk is reduced by managing the transmissions such that lines with strong crosstalk do not carry transmissions in the same time slot. This concept is implemented and enabled by any number of possible system structures. One such system structure is illustrated in FIG. 9, as discussed. The concept may also be implemented and enabled by the structure illustrated in FIG. 10. FIG. 10 has greater hardware complexity than FIG. 9, but it has greater potential flexibility and greater potential data rate bandwidth than FIG. 9, for two reasons. First, FIG. 10 has four communication chains rather than the two chains shown in FIG. 9, so more transmissions can be made in any time slot with the system illustrated in FIG. 10. Second, the bus system interface illustrated in FIG. 10 has a bus system interface, which does not appear in FIG. 9. Therefore, all of the advantage of a bus system interface, such as, for example, enhanced flexibility, backup, greater communication throughput, as discussed above in regard to FIG. 10, will also apply to an infrastructure such as illustrated in FIG. 10, implementing an allocation of time slots as illustrated in FIG. 12.

Further, the illustrative embodiment presented in FIG. 9 does not necessarily include a bus system interface connecting DFE1, DFE2, AFE1, and AFE2. However, in an alternative embodiment, not shown in FIG. 9, there would be added such a bus system interface connecting all of the digital front ends and all of the analog front ends. Then, in addition to all of the features and advantages derived from the structure shown in FIG. 9, the alternative embodiment would also offer all the advantages of a bus system interface, such as greater flexibility, backup, and enhanced communication throughput, could be afforded in this alternative embodiment.

An additional embodiment, not shown but possible, would be to add to FIG. 10 a different network of connections between the line drivers 1030 and the line interfaces 1040. In FIG. 10, the line driver 1030 of each communication chain is connected to only one line interface 1040. This network of connections could be extended, so that each line driver is connected to three line interfaces. This extended network of connections, added to the structure illustrated in FIG. 10, could then be used to derive advantages and benefits of discussed above with regard to FIG. 9. In particular, the overall goal is to ensure that no two lines having strong crosstalk will be permitted to transmit at the same time, while reducing the number of active links. That would be achieved by this extended network of connections between the line drivers 1030 and the line interfaces 1040, in which each line driver is connected to three line interfaces.

Embodiments illustrated in FIG. 12 may operate on any system, including, without limitation, any cable, wireline telephony, other wireline, wireless system, or hybrids of any of the aforementioned kinds of systems. Various embodiments may include private systems in which all of the hardware components, both server side and client side, are owned and operated by a single entity. Various embodiments may include private or public systems in which the server side components are owned and operated by a single entity, while the client side components are owned and operated by one or more different entities that do not own and operate the server side components. When there is a split between ownership and operation of the server side and client side components, the embodiments herein relate to various server side components and operations will apply only to the server side, and the embodiments herein relate to various client side components and operations will apply only to the client side.

Various embodiments include dynamic rate adaptation to the changing needs or capabilities of receivers. For most of the time, only a few connections of a communication system request high bit rates. Alternative embodiments systems, such as VDSL, transmit idle data on inactive links. In such alternative embodiments systems, system-wide optimization is not used because of the complex optimization problem that must be solved in real time, and because the optimal configuration may already be obsolete by the time the optimization routine has finished.

In contrast, some of the embodiments herein may adapt to the requested bit rates very efficiently by changing the time allocation for configuration vectors that have already been calculated. In some embodiments an optimal configuration for the proposed system setup may be computed by solving a linear program, which does not require much time or compute resources. In some embodiments, a dynamic rate adaption for the proposed system is implemented as follows, but not necessarily in this order:

The configurations for all rate allocations of interest are computed and stored in the communication units.

The achieved rates of all configurations are available at the central unit.

Whenever the requested data rates change, the optimal configuration is computed substantially real time, by solving the linear program The new allocation is distributed in substantially real time to the communication units.

In some embodiments, the system operator may use different optimization criteria for the allocation of worst case data rates, or for the additional data rate that is available when not all links need the full rate. Therefore, the optimization for the additional data rate uses a difference rate region where $R_{differencei} = R_i - R_{worstcasei}$.

The dynamic rate adaption may also be used in the proposed reduced complexity transceiver system illustrated in FIG. 9.

Embodiments related to dynamic rate adaptation may operate on any system, including, without limitation, any cable, wireline telephony, other wireline, wireless system, or hybrids of any of the aforementioned kinds of systems. Various embodiments may include private systems in which all of the hardware components, both server side and client side, are owned and operated by a single entity. Various embodiments may include private or public systems in which the server side components are owned and operated by a single entity, while the client side components are owned and operated by one or more different entities that do not own and operate the server side components. When there is a split between ownership and operation of the server side and client side components, the embodiments herein relate to various server side components and operations will apply only to the server side, and the embodiments herein relate to various client side components and operations will apply only to the client side.

One embodiment is a transceiver system that services multiple electronic communication lines. This embodiment includes a distribution point, which itself may include a central unit and multiple transceivers. This embodiment also may include multiple line interfaces, a crosstalk channel, and multiple remote terminals. In this embodiment, the system may be configured to compute locally optimal communication configurations, store in memory data about said configurations, process said data into time sharing information, convey such time sharing information to the transceivers and the remote terminals. The time sharing information is later used by the transceivers and remote terminals to transmit in accordance with such time sharing information.

One exemplary embodiment is the transceiver system just described that services multiple electronic communication lines, wherein each of the multiple transceivers includes a front end and a line driver, and where the front end includes both a digital front end and an analog front end.

One exemplary embodiment is the transceiver system described above, including the front end and line driver, wherein the number of front ends in the system is more than one and less than the number of line interfaces.

One exemplary embodiment is the transceiver system described above, including the front end the line driver, where the number of front ends is as described above, and wherein the system is configured to switch all communication transmissions between the locally optimal communication configurations.

One exemplary embodiment is the transceiver system described above, including the front end and the line driver, where the number of front end is as described above, where the system is configured to switch transmissions as described above, and wherein in any locally optimal communication configuration, the number of active transmission connections is between 0 and the number of front ends, inclusive.

One exemplary embodiment is the transceiver system described above, including the front end and the line driver, where the number of front end is as described above, where the system is configured to switch transmissions as described above, where the number of active transmission connections is as described above, and wherein the system is a wireline communication system.

One exemplary embodiment is the transceiver system described above, including the front end and the line driver, where the number of front end is as described above, where the system is configured to switch transmissions as described above, where the number of active transmission connections is as described above, and wherein the system is a wireless communication system.

One exemplary embodiment is the transceiver system described above, including the front end and the line driver, where the number of front end is as described above, where the system is configured to switch transmissions as described above, where the number of active transmission connections is as described above, and wherein the system is a hybrid communication system.

One exemplary embodiment is the transceiver system that services multiple electronic communication lines, described above, wherein each remote terminal has a guaranteed data for transmit from the terminal or for reception to the terminal or for both transmit and reception. In this embodiment, the system is configured to calculate locally optimal configurations where the system serves all the guaranteed data rates to and from all remote terminals, and the system is also configured to adapt the locally optimal configurations to server some remote terminals with higher than guaranteed data rates, when others of the remote terminals either are inactive or require less than their guaranteed rates.

One exemplary embodiment is the transceiver system described above, including the guaranteed rate as described, including configuration to calculate and adapt to locally optimal configurations described above, wherein each of the multiple transceivers includes a front end and a line driver, and wherein each front end includes a digital front end and an analog front end.

One exemplary embodiment is the transceiver system described above, including the guaranteed rate as described and the configurations to calculate and adapt to locally optimal configurations, including the multiple transceivers as described above, wherein the number of front ends in the system is more than one and less than the number of line interfaces.

One exemplary embodiment is the transceiver system described above, including the guaranteed rate as described and the configurations to calculate and adapt to locally optimal configurations, including the multiple transceivers as described above, where the number of front ends in the system is more than one and less than the number of line interfaces, and wherein the system is configured to switch all communication transmissions between the locally optimal communication configurations.

One exemplary embodiment is the transceiver system described above, including the guaranteed rate as described and the configurations to calculate and adapt to locally optimal configurations, including the multiple transceivers as described above, where the number of front ends in the system is more than one and less than the number of line interfaces, where the system is configured to switch communication transmissions as described, and wherein in any locally optimal communication configuration, the number of active transmission connections is between 0 and the number of front ends, inclusive.

One exemplary embodiment is the transceiver system described above, including the guaranteed rate as described and the configurations to calculate and adapt to locally optimal configurations, including the multiple transceivers as described above, where the number of front ends in the system is more than one and less than the number of line interfaces, where the system is configured to switch communication transmissions as described, where the number of active transmission connections is as described above, and wherein the system is a wireline communication system.

One exemplary embodiment is the transceiver system described above, including the guaranteed rate as described and the configurations to calculate and adapt to locally optimal configurations, including the multiple transceivers as described above, where the number of front ends in the system is more than one and less than the number of line interfaces, where the system is configured to switch communication transmissions as described, where the number of active transmission connections is as described above, and wherein the system is a wireless communication system.

One exemplary embodiment is the transceiver system described above, including the guaranteed rate as described and the configurations to calculate and adapt to locally optimal configurations, including the multiple transceivers as described above, where the number of front ends in the system is more than one and less than the number of line interfaces, where the system is configured to switch communication transmissions as described, where the number of active transmission connections is as described above, and wherein the system is a hybrid communication system.

One exemplary embodiment is a system operative to serve multiple electronic communication lines. This embodiment may also include a distribution point, which itself includes a central unit and multiple transceivers. This embodiment may also include multiple line interfaces, and a crosstalk channel. In this embodiment, the system is configured to compute locally optimal communication configurations, store in memory data about said configurations, process said data into time sharing information, convey such time sharing information to the transceivers. The time sharing information is later used by the transceivers to transmit in accordance with such time sharing information.

One exemplary embodiment is the transceiver system just described that services multiple electronic communication lines with a central unit, multiple transceivers, multiple line interfaces, and a crosstalk channel, wherein each of the multiple transceivers includes a front end and a line driver, and where the front end includes both a digital front end and an analog front end.

One exemplary embodiment is the transceiver system described above with a central unit, multiple transceivers, multiple line interfaces, and a crosstalk channel, including the front end and line driver, wherein the number of front ends in the system is more than one and less than the number of line interfaces.

One exemplary embodiment is the transceiver system described above with a central unit, multiple transceivers, multiple line interfaces, and a crosstalk channel, including the front end the line driver, where the number of front ends is as described above, and wherein the system is configured to switch all communication transmissions between the locally optimal communication configurations.

One exemplary embodiment is the transceiver system described above with a central unit, multiple transceivers, multiple line interfaces, and a crosstalk channel, including the front end and the line driver, where the number of front end is as described above, where the system is configured to switch transmissions as described above, and wherein in any locally optimal communication configuration, the number of active transmission connections is between 0 and the number of front ends, inclusive.

One exemplary embodiment is the transceiver system described above with a central unit, multiple transceivers, multiple line interfaces, and a crosstalk channel, including the front end and the line driver, where the number of front end is as described above, where the system is configured to switch transmissions as described above, where the number of active transmission connections is as described above, and wherein the system is a wireline communication system.

One exemplary embodiment is the transceiver system described above lines a central unit, multiple transceivers, multiple line interfaces, and a crosstalk channel, including the front end and the line driver, where the number of front end is as described above, where the system is configured to switch transmissions as described above, where the number of active transmission connections is as described above, and wherein the system is a wireless communication system.

One exemplary embodiment is the transceiver system described above with a central unit, multiple transceivers, multiple line interfaces, and a crosstalk channel, including the front end and the line driver, where the number of front end is as described above, where the system is configured to switch transmissions as described above, where the number of active transmission connections is as described above, and wherein the system is a hybrid communication system.

One exemplary embodiment is a central unit that may be part of a communication system operative to serve multiple electronic communication lines. The central unit may include a unit that receives electronic data related to receiver channel characteristics, an optimizer that operates an optimization routine to compute multiple locally optimal configurations and to identify locally optimal configuration points needed to reach desired data rates, a memory to store the locally optimal configurations and locally optimal configuration points, a unit that computes a media access plan to achieve optimal system communication according to a criterion, and a unit that conveys the media access plan to transceivers that will transmit in accordance with the plan.

One exemplary embodiment is the central unit that may be part of a communication system operative to serve multiple electronic communication lines, wherein the a unit that receives electronic data related to channel characteristics is an electronic receiver or an electronic transceiver.

One exemplary embodiment is the central unit that may be part of a communication system operative to serve multiple electronic communication lines, wherein the a unit that conveys the media access plan is an electronic transmitter or an electronic transceiver.

One exemplary embodiment is the central unit that may be part of a communication system operative to serve multiple electronic communication lines, wherein the media access plan includes information about time slots, about when transceivers should transmit, and about the power levels at which transceivers should transmit.

One exemplary embodiment is the central unit that may be part of a communication system operative to serve multiple electronic communication lines, wherein the a unit that computes a media access plan to achieve optimal system communication according to a criterion are a data processing module within the central unit.

One exemplary embodiment is the central unit that may be part of a communication system operative to serve multiple electronic communication lines, including the data processing module described above, wherein the criterion is one of selected from the group consisting of (i) a rule for absolute fairness; (ii) a rule for relative fairness; and (iii) a rule for maximizing the sum of all data rates.

One exemplary embodiment is the central unit that may be part of a communication system operative to serve multiple electronic communication lines, wherein the memory also stores information about data rates guaranteed to various communication units, the electronic data about receiver channel characteristics comprises data about when a communication unit is in active and data about when a communication unit requires less than its guaranteed rate, the a unit that computes a media access plan further comprises a unit to calculate locally optimal configurations and locally optimal parameters when all communication units are served with their guaranteed rates, and the a unit that computes media access plan further comprises a unit to calculate different combinations of locally optimal configurations when one or more communication units are either in active or require less than their guaranteed rates. In this aspect, the different combinations include time sharing information that will provide higher than guaranteed rates to some communication units at a time when one or more other communication units either are inactive or require less than their guaranteed rates.

Figure 13:
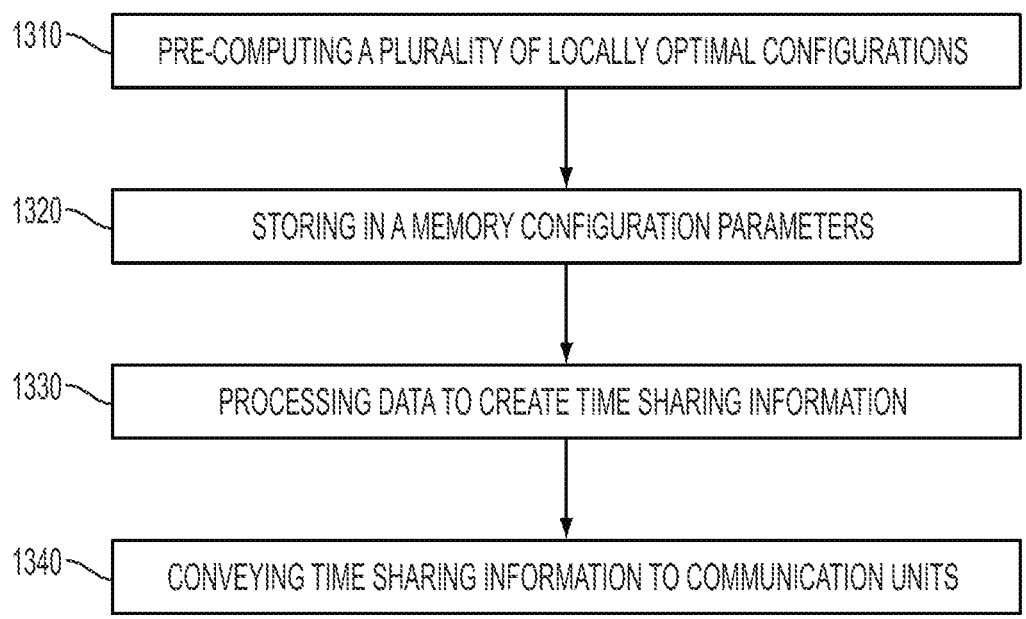
FIG. 13 illustrates a flow diagram describing one embodiment of a method for a transceiver system pre-computing locally optimal configurations to enhance communication.

FIG. 13 illustrates a flow diagram describing one embodiment of a method for a transceiver system pre-computing locally optimal configurations to enhance communication. In step 1310, pre-computing multiple locally optimal configurations. In step 1320, storing in memory the multiple locally optimal configurations and configuration parameters. In step 1330, processing the locally optimal configurations and configuration parameters data, to create time sharing information. In step 1340, conveying the time sharing information to communication units.

In one exemplary embodiment, time sharing information that may be conveyed by the central unit to communication units, and is then used by the communication units to transmit according to the media access plan.

Embodiments illustrated in FIG. 13 may operate on any system, including, without limitation, any cable, wireline telephony, other wireline, wireless system, or hybrids of any of the aforementioned kinds of systems. Various embodiments may include private systems in which all of the hardware components, both server side and client side, are owned and operated by a single entity. Various embodiments may include private or public systems in which the server side components are owned and operated by a single entity, while the client side components are owned and operated by one or more different entities that do not own and operate the server side components. When there is a split between ownership and operation of the server side and client side components, the embodiments herein relate to various server side components and operations will apply only to the server side, and the embodiments herein relate to various client side components and operations will apply only to the client side.

Figure 14:
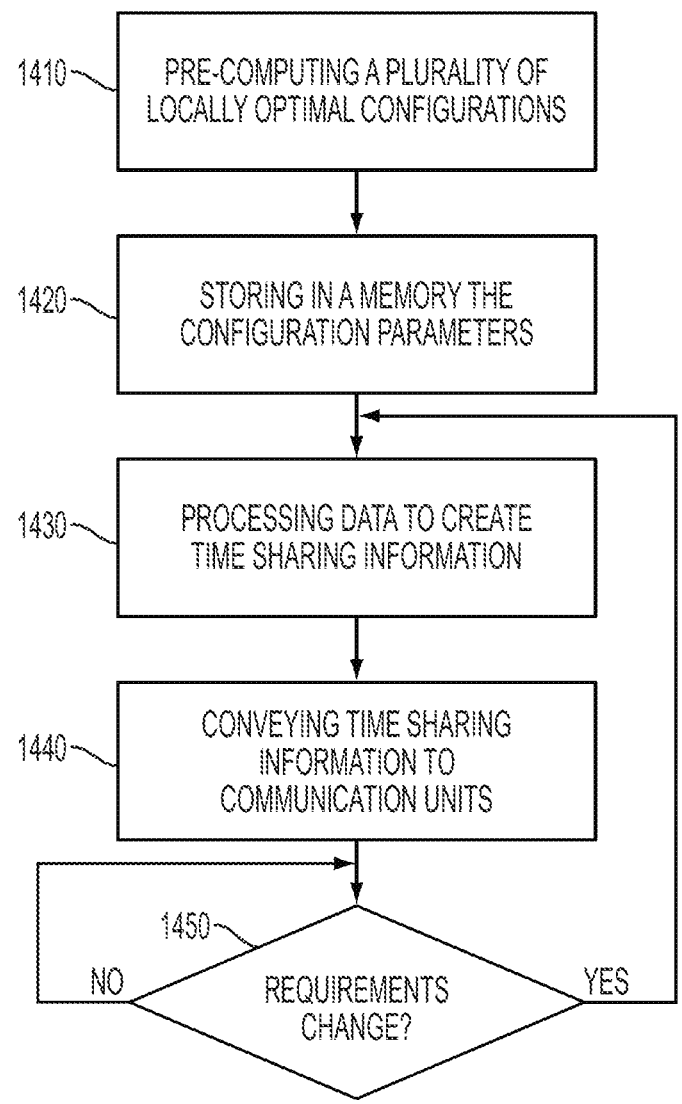
FIG. 14 illustrates a flow diagram describing one embodiment of a method for a transceiver system pre-computing locally optimal configurations to enhance communication.

FIG. 14 illustrates a flow diagram describing a embodiment of a method for a transceiver system pre-computing locally optimal configurations to enhance communication, in which the method may include additionally or in the alternative a dynamic rate adaptation, based on a change in the data rate requirements of one or more communication units which, at a particular point of time, are either inactive or require less than their guaranteed data rate. In step 1410, pre-computing multiple locally optimal configurations. In step 1420, storing in a memory the multiple locally optimal configurations and configuration parameters. In step 1430, processing the locally optimal configurations and configuration parameters data, to create time sharing information. In step 1440, conveying the time sharing information to communication units. In step 1450, the system inquires as to whether the requirements of the communication units have changed, either permanently or temporarily (where "temporarily" may mean for one a single time slot, or for a longer period of time). If the answer is "NO", the requirements have not changed, then nothing more is done. If the answer is "YES", the requirements have changed, then the additional data is processed in step 1430, and new time sharing information is conveyed in step 1440, all as shown in FIG. 14. The system may also be programmed so that a separate system inquiry is not required, but rather the communication units will report automatically changes in requirements, or the communication units will automatically report their status according to some time schedule.

Embodiments illustrated in FIG. 14 may operate on any system, including, without limitation, any cable, wireline telephony, other wireline, wireless system, or hybrids of any of the aforementioned kinds of systems. Various embodiments may include private systems in which all of the hardware components, both server side and client side, are owned and operated by a single entity. Various embodiments may include private or public systems in which the server side components are owned and operated by a single entity, while the client side components are owned and operated by one or more different entities that do not own and operate the server side components. When there is a split between ownership and operation of the server side and client side components, the embodiments herein relate to various server side components and operations will apply only to the server side, and the embodiments herein relate to various client side components and operations will apply only to the client side.

Figures 15, 16:
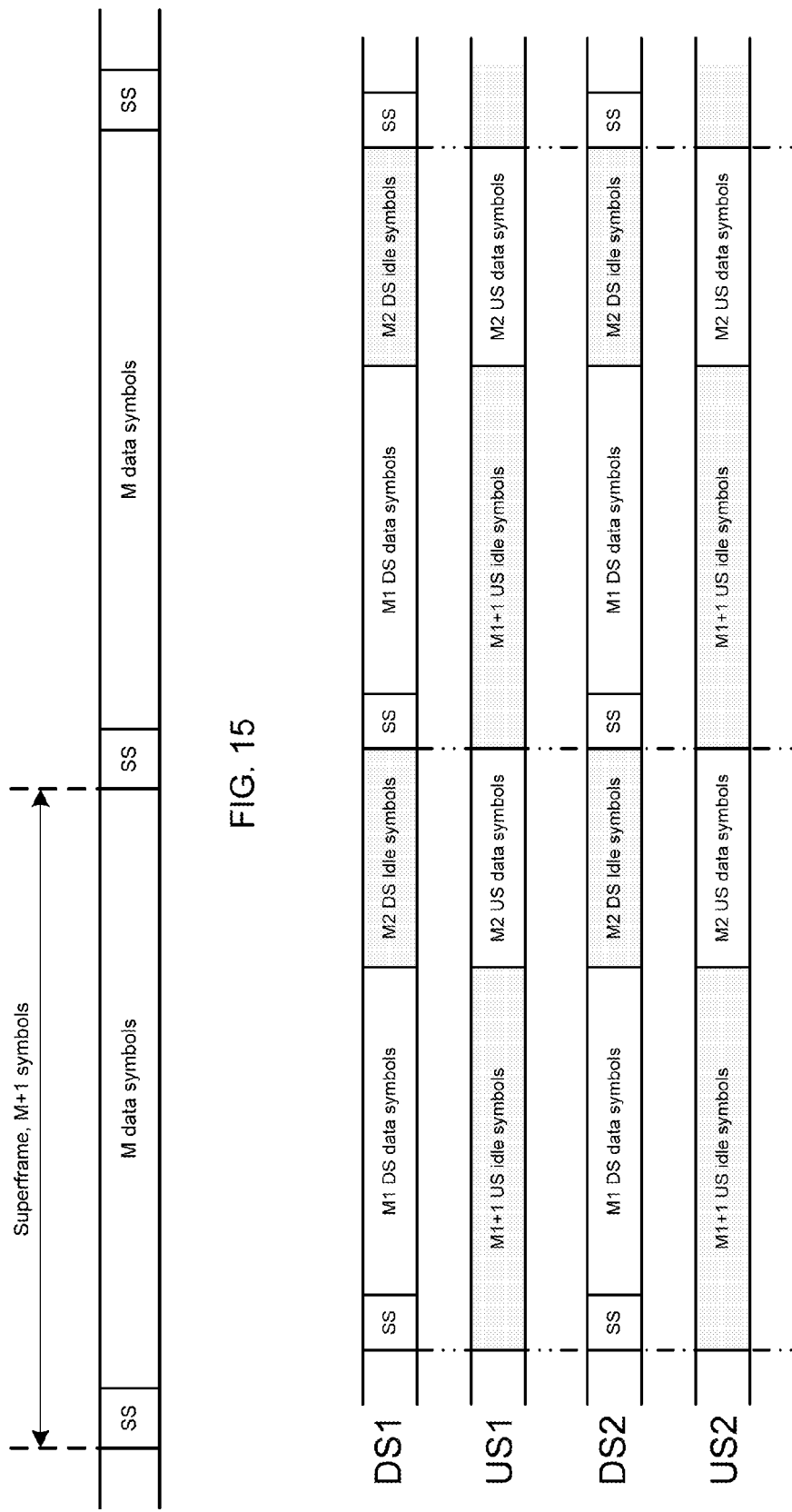
FIG. 15 shows an embodiment of a superframe structure.
FIG. 16 shows an embodiment of a transmission timeline having one DS and one US slot per superframe.

An embodiment of the described transmission concept is presented in FIGS. 15-19. FIG. 15 shows the superframe that contains M+1 symbols; it starts from a sync-symbol (SS) followed by M data symbols ("data" in the context of this description may be a general term used to identify, e.g., user data, control or management commands or data, or symbols with special content, like probe symbols or quiet symbols, if necessary for transmission purposes). For example, a DP sends superframes one after another with no gaps. All symbols in a superframe may have the same duration that, for example, depends on the selected value of a cyclic prefix. In an embodiment the number of data symbols in the superframe is chosen in a way that allows the remote terminal, for example, a CPE to maintain stable synchronization and/or, in an embodiment, if necessary, perform crosstalk channel estimation by using sync symbol SS. In an embodiment the overhead caused by using a superframe is 1/(M+1).

In some embodiments, if required for proper synchronization, a sync-symbol may be combined from a number of consecutive symbols. In this case, the overhead is S/(M+S), where S is the number of symbols forming an SS.

FIG. 15 shows an embodiment of a basic superframe structure. In an embodiment of transmission, groups of successive symbols inside a superframe are assigned for upstream and/or downstream, and are interleaved with each other. In an embodiment SS symbols are sent only in the downstream direction. In an embodiment in the upstream direction, if necessary, SS can also be introduced (e.g., for vectoring or other purposes).

In an embodiment the position of SS is synchronized over all lines. In an embodiment synchronisation of SS is both in downstream and in upstream, if SS are used (e.g., for vectoring purposes). In an embodiment a minimum shift between upstream and downstream sync symbols may be useful, e.g., for implementation purposes. In an embodiment this shift is set during the initialization. In an embodiment the position of data symbols, accordingly, may also be aligned between all lines, both in downstream and in upstream directions.

FIG. 16 shows an embodiment of transmission timeline one DS and one US slots per superframe. In FIG. 16 one upstream (US) and one downstream (DS) transmission are established during a superframe. The number of DS and US transmissions may be more than one, although all DS and all US transmissions shall be synchronized in all lines and same number of US and DS transmissions shall be in each superframe. An example of three DS-US transmissions during a superframe is presented in FIG. 16: all DS periods and all US periods are the same inside one superframe. The number of symbols for DS and US transmission is determined during system initialization and may be modified seamlessly during the showtime by using an appropriate management protocol. In an embodiment portions of US and DS transmission may overlap. At least one effect may be to take into account switch times wherein a first transceiver continues to send/receive while a second transceiver switches from receipt to send, and send to receipt, respectively. At least one effect is to use time available at reduced crosstalk for sending/receiving data, wherein the crosstalk reduction results from the second transceiver being busy with switching rather than with transmitting. FIG. 17 shows an embodiment of a superframe that includes three DS and three US slots.

Note that the number of data symbols in each direction, denoted by M1 and M2 in FIG. 17, actually represents the time position of symbols allocated for upstream or downstream transmission rather than actual transmission. This relates to an exemplary situation when no data is available for transmission at the beginning of the upstream or downstream time position, respectively. In one embodiment, if DP or CPE has no data to transmit during all the symbols allocated for transmission, it may transmit idle symbols (e.g., loaded by a pseudo-random signal instead of data). In another embodiment, symbols may not be transmitted at all (quiet periods). In an exemplary case of no transmission over one or more symbols (one or more quiet symbols are transmitted), the transmitter may indicate to the receiver (e.g., in one of the symbols) how many symbols were transmitted and/or at what positions in the superframe.

In an embodiment of transmission, groups of successive symbols inside a superframe are assigned for upstream and/or for downstream of different transmission media, e.g., lines, interleaved with each other, e.g., in an arbitrary order. In an embodiment the sync symbols (SS) are also sent only in the downstream direction, but in an embodiment SS may be also used in the upstream direction, in particular if needed or necessary (e.g., for vectoring or other purposes).

FIG. 18 shows an example of a superframe including periods of upstream and downstream transmission for two transmission media, for example transmission lines, #1 and #2, respectively. Transmission timelines of each transmission medium in the upstream and downstream directions are also shown. In an embodiment SS are transmitted only in the downstream, aligned among all lines. All boundaries of upstream and downstream transmissions are also aligned to avoid FEXT and NEXT between lines sourced by the DP.

FIG. 18 shows an example of superframe structure and STDMA transmission time line for 2 transmission media.

In an exemplary case where transmission media such as lines of the same drop cable are connected to more than one DP or a where DP contains more than one STDMA group, time slots assigned to some of the transmission media connected to different DP may be collocated in time in case there is little or no interference between these lines. In an embodiment irrespective of the number of DP or a number of STDMA groups in a DP, interference between communication signals transmitted using the transmission media is mutually cancelled (i.e., the time slot reuse).

In an embodiment sampling clock and/or symbol timing shall be synchronized between the DP and all connected terminals such as CPE. In an embodiment the SS are one source for synchronization, in particular, if its content is defined in appropriate way. In an embodiment, a few pilot tones may be used, in an embodiment in addition to SS, to achieve synchronization. An effect of this embodiment may be to achieve permanent and/or precise synchronization. In an embodiment pilot tones are assigned by the DP; the number, the frequencies, and/or possibly other parameters of pilot tones are communicated to the CPEs during initialization.

In an embodiment, if pilot tones are assigned, the DP substantially continuously transmits pilot tones, for example, during the showtime. New lines may use transmitted pilot tones for initial clock synchronization and symbol synchronization. Further, depiction of SS provides superframe synchronization (which may be needed for alignment, for example, of time intervals for DS and US transmission).

In an embodiment, in the upstream direction, symbols of all lines are also synchronized. In an embodiment, to provide symbol synchronization, DP estimates the time difference between upstream symbols arriving from different lines and sends control messages to corresponding terminals, such as CPE; to adjust the timing (for example, by number of samples).

In an embodiment transmission time slots (TS) are used to assign the particular transmission time (or transmission opportunity time) for a specific line in upstream and/or downstream direction ($TS_{DS-k}$, $TS_{US-k}$ denote time slots for upstream and downstream transmission for line k).

In an embodiment all TS shall have duration that is an integer number of symbols. In an embodiment, when a particular transceiver is granted a transmission opportunity, it may use the granted TS starting from any symbol of the TS. An effect of this embodiment may be that the TS are aligned with a respective superframe; referring to the superframe example presented on the top of FIG. 18, the following TS will be assigned (listed in the time order as in FIG. 18): $TS_{DS-1}$ (M1 symbols), $TS_{DS-2}$ (M2 symbols), $TS_{US-1}$ (M3 symbols), $TS_{DS-2}$ (M4 symbols), $TS_{US-2}$ (M5 symbols), and so on. In an embodiment the SS has its default $TS_{DS-SS}$, other TS may be programmable: their assignment and duration may depend, for example, on traffic requests from connected users. In an embodiment the transmitter shall indicate to the receiver from which symbol of the TS it starts the transmission. In some embodiments, a special indication signal is sent before the first data symbol to be transmitted in the time slot. In another embodiment, idle symbols are sent until first data symbol is available for transmission.

In an embodiment, in an example: TDD, each assigned TS is for all lines, (see FIG. 17): the size of the TS determines the ratio between upstream and downstream and the duration of the upstream-downstream exchange cycle. In an embodiment the TS assignment may usually be permanent; in an embodiment it may be changed, however, under control, for example, of service provider, in particular, as an extraordinary procedure (for example, upon re-initialization of the binder). As an effect, in an embodiment, no dynamic re-assignment of TS may be needed.

In an embodiment, in an example: STDMA, TS is dynamically assigned per transmission medium. In an embodiment TS is dynamically assigned per direction. In an embodiment, assignment per transmission medium and/or per direction is based on the particular service request from each terminal. In an embodiment some TS may be assigned for all lines for broadcast (e.g., TSDS-SS) or for more than one line (multicast, if same information has to be sent to more than one terminal). These TS are usually for generic management/control information. In an embodiment, during broadcast TS, the transmit power over each transmission medium may be decreased by a number of dBs. An effect may be to reduce peak power consumption.

In an embodiment, the dynamic assignment of TS is by broadcasting a special control information. In an embodiment the information is comprised in a message called Medium Access Plan (MAP). In an embodiment this message includes the list of TS. In an embodiment the TS are assigned to both the DP and all terminals for transmitting and receiving data symbols, respectively. The TS assignment may be defined as valid, for example, until the next MAP, or as persistent, for example, until it expires or gets modified. In an embodiment the MAP is distributed with every superframe. In an embodiment the MAP is sporadically distributed in selected superframes. In an embodiment the MAP is selectively distributed outside superframe transmission, for example, during an initialisation phase or during a re-initialisation phase while no superframe is transmitted.

Figure 19:
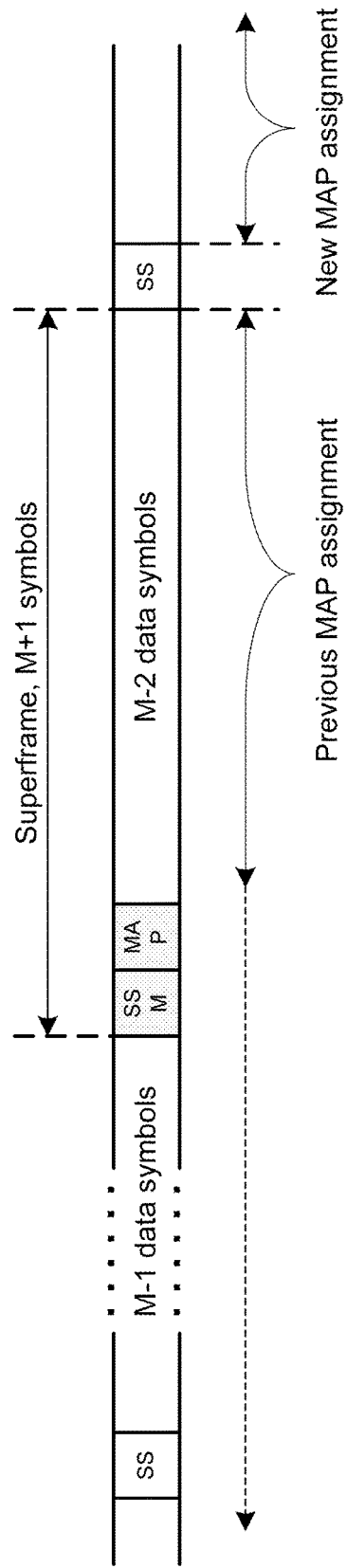
FIG. 19 shows an exemplary symbol carrying media access plan that follows a sync symbol with a format for use in an embodiment.

In an embodiment the position of the MAP-carrying symbol maybe fixed in the superframe or in a group of superframes (such group hereinafter also referred to as hyperframe) or the position of MAP-carrying symbol may be dynamic and/or be indicated in a previous MAP (by number of symbols). An effect of the embodiment employing a dynamic MAP positioning may be that MAP may be sent only as needed so as to avoid transmission overhead. Fixed position of the MAP symbol simplifies its search. In one embodiment, MAP symbol is on a fixed position in a superframe, but superframes carrying a MAP are indicated to the terminal by special SS format (e.g., inverted SS, SS modulated differently than a regular SS, SS carrying special modulation patterns over selected tones, etc). An effect of this embodiment may be that the MAP can be potentially be modified every superframe, i.e., for example in a digital subscriber line standard with a granularity of tens of milliseconds, which in a typical application may be more than sufficient for practical purposes. In an embodiment the MAP message inside the superframe follows the SS, while the assignment communicated in the MAP is valid from a following superframe, in particular, as shown in FIG. 19, in the immediately following superframe. FIG. 19 shows an embodiment of a symbol carrying MAP that immediately follows an SS with special format. In the embodiment depicted in FIG. 19, no symbol including any MAP message is transmitted in the previous and in the subsequent superframes.

In an embodiment, besides TS assignment information, the MAP message may also carry other information, for example, related to the particular TS, like request for acknowledgement, specific coding and/or modulation parameters, etc. In an embodiment the MAP message may also include generic information for all terminals, such as transmit power limits, spectrum limits, bit loading information/tables and similar. In an embodiment the MAP message includes a pointer to information provided to the respective unit/terminal at a different time before receipt of the respective MAP message. An effect of this embodiment may be to save data channel bandwidth by pre-determining and storing in each unit sets of parameter values or other MAP information, while the present MAP message may only include a pointer to a selected set of such information.

An embodiment addresses transmission timing issues related to propagation delay in the line $T_d$ which typically mainly depends on length and/or type of the transmission medium, in particular where the transmission medium is a wireline. For example, the value of $T_d$ for the many cable types is (2-5) us per kilometer. For 200 m wireline loops, the value of $T_d$ typically doesn't exceed 1 us, which, in a typical wireline example, is a small fraction of symbol duration (24.48 us if 2048 carriers are used in 100 MHz of frequency spectrum).

In an embodiment a guard time may be used between transmission and reception. In an exemplary case of TDD, the guard time may be used, for example, to convert transmission circuitry from transmission mode to reception mode, and vice versa. In an embodiment the same circuitry is used for both transmission and reception circuitry; switching between transmission and reception, and/or vice versa, takes a turnaround time, wherein turnaround time may depend on the particular circuit and/or portions of circuit involved and/or subject to the switch, and/or depend on the direction of switching from transmission to reception or reception to transmission. An embodiment is presented in FIG. 20, wherein downstream transmission timing is aligned with symbol timing and same for the upstream.

Figure 20:
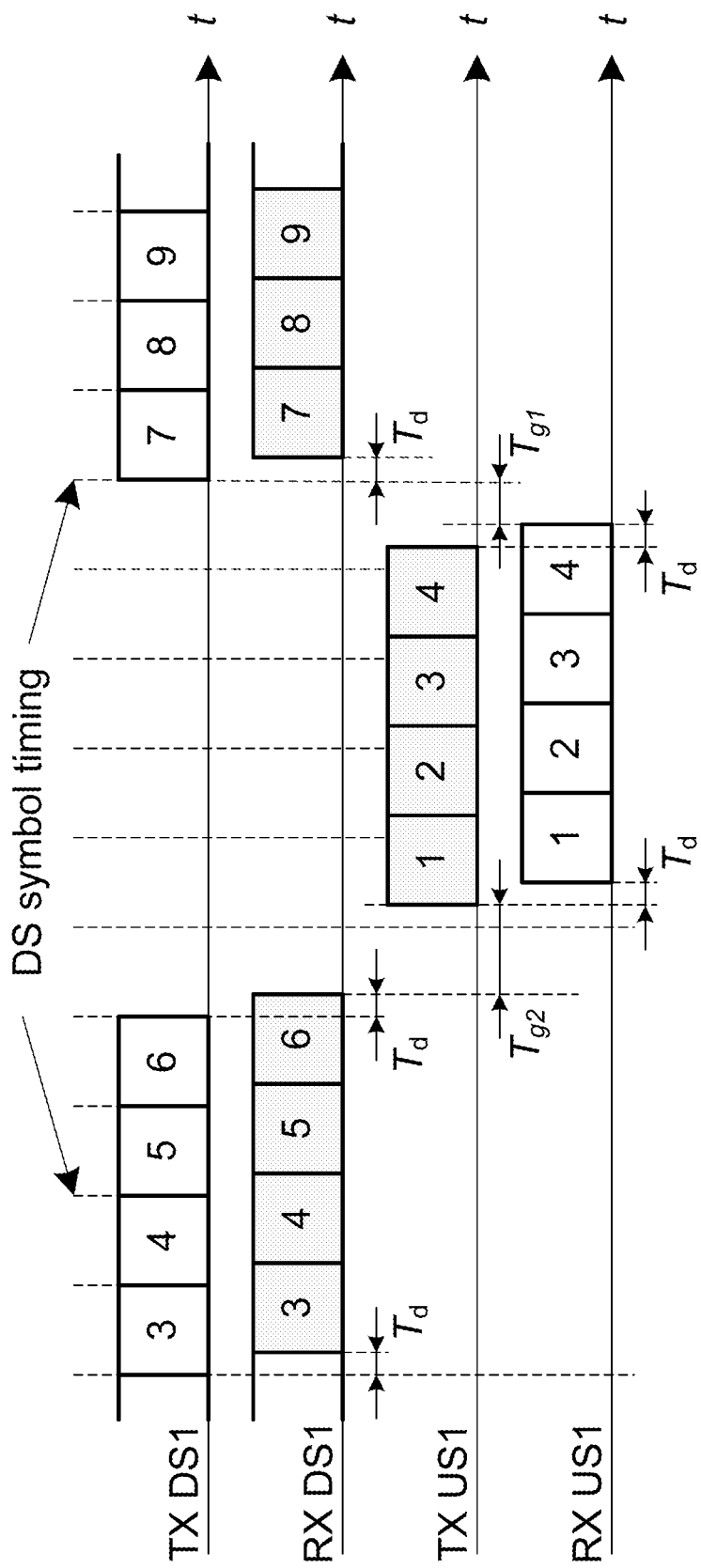
FIG. 20 shows a first exemplary transmission timing at the distribution point and at terminals.

FIG. 20 shows an embodiment with transmission timing at the DP (TX DS1, RX US1) and terminal (RX DS1, TX US1). In an embodiment, to keep this alignment, the sum of the guard time at the CPE (Tg1) and at the CO (Tg2) shall satisfy equation [1]:

$$T_d + T_{g2} + T_d + T_{g1} = n \times T_{OFDM}, \text{ and } T_{g2} + T_{g1} = n \times T_{OFDM} - 2T_d,$$ [1]

where: n=1, 2, . . . and $T_{OFDM}$ is the symbol period. To provide the same guard time at the DP and at the CPE, $T_g = 0.5n \times T_{OFDM} - T_d$, and the minimum achievable guard time is $T_{g\text{-}MIN} = 0.5T_{OFDM} - T_d$ (which is roughly 1 us less than half of the symbol duration). In an embodiment, longer guard times are allowed. In an embodiment guard times respect equation [1], which means that if the required value of guard time is higher than $T_{g\text{-}MIN}$, the second valid value is $T_g = T_{OFDM} - T_d$, and so on, with granularity of selection equal 0.5 $T_{OFDM}$.

In an embodiment using STDMA, a guard time is used at the terminal when it shall transmit right after it receives (i.e., a $TS_{DS\text{-}k}$ in the superframe is followed by $TS_{US\text{-}k}$), but not used if transmission is granted to another terminal (i.e., a $TS_{DS\text{-}k}$ in the superframe is followed by $TS_{US\text{-}i}$). A guard time it is used also at the DP to switch from transmission to reception and back, for example, in case DP uses the same circuitry for transmission and reception. As can be seen from FIG. 20, in an embodiment the guard time available for the DP is equal to the guard time assigned for a terminal to transmit over the same line plus $2T_d$, i.e., $T_{g2} + 2T_d$. Since the value of $T_d$ is usually much less that the minimum required value of $T_{g2}$, using the same guard time for all lines doesn't result in any considerable increase of the overhead.

Figure 21:
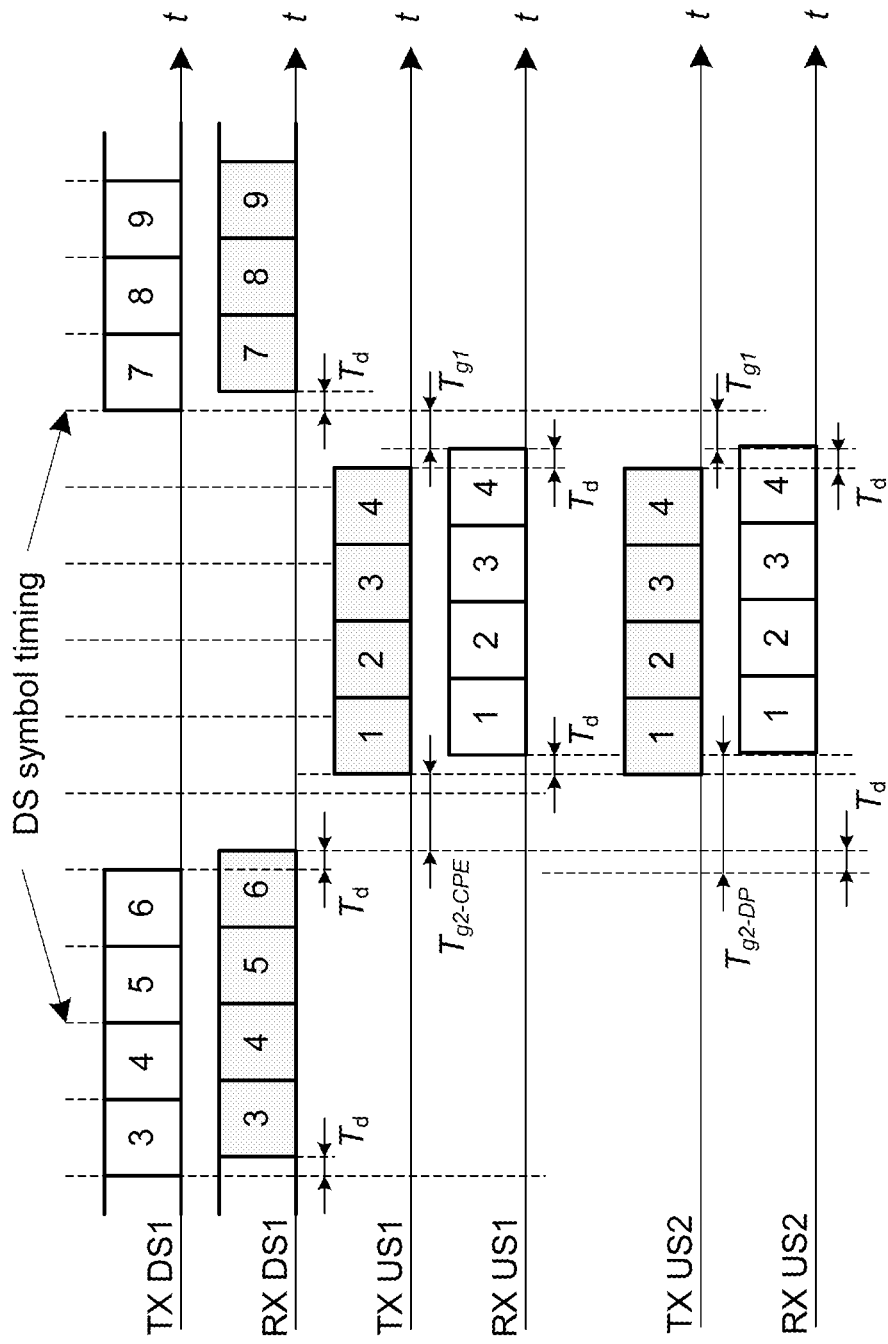
FIG. 21 shows a second exemplary transmission timing at the distribution point and at terminals.

FIG. 21 shows an embodiment with the case of terminal transmission over the same line (TX US1) and with another case over the different transmission medium (TX US2). The guard time allowed for the DP ($T_{g2\text{-}DP}$) is $2T_d$ bigger than one selected by a terminal such as CPE. An effect may be that if CPE and DP require approximately the same time to switch from transmission to reception and back, the CPE determines the value of the guard time $T_{g2}$. FIG. 21 shows an embodiment with STDMA transmission timing at the DP (TX DS1) and CPE (RX US1, RX US2) and transmission at a first terminal right after reception (TX US1, RX DS1) while a second terminal is in idle state (TX US2). In an embodiment DP is implemented with a capability to transmit and receive simultaneously (a duplex device). In an embodiment the value of $T_{g2}$ for terminals transmitting from idle state may be set to 0. If $T_{g2}$ is set to 0, the value of $T_{g1}$ can be found from equation [1]: $T_{g1} = n \times T_{OFDM} - 2T_d$, and the minimum valid value $T_{g1\text{-}MIN} = T_{OFDM} - 2T_d$. If the required value of the guard time is more than $T_{g1\text{-}MIN}$, the next valid value is $2T_{OFDM} - 2T_d$, accordingly. If the system uses $T_{g2} = 0$ for CPEs that transmit from idle state, the DP can distinguish between transmissions of CPEs using $T_{g2} = 0$ and $T_{g2} \neq 0$ by the ID of the TS assigned for the transmission.

In an embodiment the CPE may request the DP to retransmit data units (DU), for example, when received in error if retransmission capability is assigned for a particular service. If a terminal such as a CPE receives one or more DUs in error and retransmission capability for the service these DUs belong to is set, in an embodiment the CPE sends to the DP a retransmission request for these DUs. In an embodiment, upon reception of this request, the DP may retransmit the indicated DTUs at the first available transmission opportunity. In an embodiment retransmission may take place at a another transmission opportunity than provided by the first available transmission opportunity. In an embodiment the retransmission request of the terminal such a CPE is embedded into the first available $TS_{US}$ following the $TS_{DS}$ during which an errored DU was received. In one embodiment, retransmission request is a special management message transmitted during the mentioned $TS_{US}$. In another embodiment, retransmission request is encoded into the first symbol of the mentioned $TS_{US}$. This allows the DP to get the retransmission request earlier in time and thus DP gets more time available to prepare for retransmission. More than one symbol may be used for retransmission request, if needed, but the number of symbols shall be pre-defined.

Similarly, the DP may request a CPE to retransmit DUs. For the example of upstream/downstream transmission allocations presented in FIG. 18, the retransmission request on errored reception of DUs transmitted during M1 DS1 data symbols is sent during M3 US1 data symbols. The requested DUs are retransmitted during M6 DS1 data symbols.

In an embodiment, when DP is powered up upon connection of the first terminal such as a CPE, the DP starts line initialization process to establish connection with the CPE. For this, in an embodiment DP starts transmission of special initialization sequences to the terminal and terminal replies accordingly. During the exchange of initialization sequences, one or both of DP and terminal do one or more of discover parameter values of the transmission channel, for example by measurement, and adjust their analog front end (AFE) circuitry. In an embodiment the terminal selects transmission parameters (for example, bit loading, FEC parameters, and/or interleaving) to be used during the communication such as provided in showtime in one or both of upstream direction and downstream direction. In an embodiment transmission parameters are provided by a central office (CO) that, for example, based on measurement results provided by the terminal to the central office. In an embodiment right after initialization procedure is complete, data and management information is exchanged between DP and CPE using, for example, superframe format as defined above. In an embodiment such information exchange takes place at a time dissociated from the initialization phase. In an embodiment the duration of the superframe is selected by the DP management system, for example, based on the target application, in particular within a range determined in a relevant communication standard.

Initialization procedure may be different in an embodiment for TDD and in an embodiment for STDMA. In an embodiment all activated lines are trained in parallel, using special training sequences to evaluate crosstalk coefficients, for example, if vectoring is used. In an embodiment for STDMA transmission media are trained sequentially, for example by exchanging few probe sequences between DP and each of the connected terminals. These probe sequences may comprise symbols carrying certain signal patterns, for example encapsulated into a standard superframe, instead of data symbols. In case vectoring is used, other transmission media collect crosstalk samples from the trained transmission medium to establish cancellation matrix.

In an embodiment iterative training may be advantageous to cut the initialization time. With iterative training, DP and CPE start exchange of data symbols using very low bit loadings, low coding gain, and in an embodiment even using repetitions. After several transmissions, receivers of both sides learn the channel and obtain more appropriate values of transmission parameters. These values are communicated between CPE and DP using management frames. After parameters are updated, the bit rate will increase, and the receiver may continue optimization of parameter settings, updating them from time to time.

During initialization (usually, at the beginning of it), both ends may exchange initial management data, such as optional functional capabilities, specific networking or user information, etc. This data may be supplied using special communication protocols used during the initialization that are beyond the scope of the embodiment.

In an embodiment for STDMA, a CPE that intends to join the DP has to synchronize with the DP by listening to SS (may first use pilot tones to get symbol timing and then the SS to align to a superframe). Then, in an embodiment, CPE shall wait for a TS assigned for new-corners ($TS_{NC-k}$); this TS is assigned by the DP to all idle lines connected to service, so that it periodically appears at each line (e.g., using round-robin, at least once upon a pre-defined time period).

In an embodiment, when idle transmission medium such as line k (connected to the service) received the $TS_{NC-k}$, it shall transmit its initialization request signal or message, for example, during the $TS_{NC-k}$, using either only the tones used in the SS or tones that are specially assigned for initialization request. This way registering CPE never violated the used bandplan and doesn't use masked sub-carriers.

In an embodiment, a CPE that intends to join initiates the connection with its peer transceiver of the DP by sending a registration request signal or message at any time assigned for upstream transmission. This request may use tones used by the SS or tones specially assigned for initialization request.

In an embodiment when the service requested by the user is complete (user switches the system off), the terminal such as a CPE transmits to the DP a management message informing request of de-activation. The DP may either accept the request or not. If the request is accepted, the DP sends to the CPE a de-activation permission (different types of permissions are available, and are beyond the scope of this embodiment). If the request is not granted, the CPE stays in idle mode, in which case no $TS_{DS}$ or $TS_{US}$ for this CPE are assigned. To re-activate (from either de-activated or idle mode) the CPE shall send an initialization request, as described in 5.2.9.

In case a DP incorporates transmission media that are capable to operate in mixed systems mentioned herein, in which any transmission medium such as a wireline and/or a wireless connection in a particular period of time can be either in TDD or STDMA mode, an embodiment according to the implementation may provides basic framing format, synchronization, training and other operations used to perform on the lines when configuration change is due.

An embodiment according to the implementation introduces special signals (superframe, syncsymbols, MAP, etc.) and/or a protocol associated with transmission and reception of these signals. An embodiment is implemented in a hidden node.

An exemplary communication arrangement may employ one, two or more multicarrier apparatuses, transceivers and/or nodes. The exemplary communication arrangement may also employ a multicarrier controller apparatus or controller node. In one implementation, the multicarrier apparatuses/controller are Orthogonal Frequency Division Multiplexing (OFDM) apparatuses capable of implementing the herein described implementations. One or more apparatuses, transceivers or nodes may implement the embodiments described herein.

The multicarrier apparatuses may communicate through a communication channel. The communication channel may be realized as a wireless communication medium, a wireline communication medium (e.g., coaxial cable, twisted pair of copper wires, power line wiring, optical fiber, etc.), or combinations thereof. Accordingly, the multicarrier apparatuses, may include structure and functionality that enable signal communication over such medium. Such structure and functionality may include one or more antennas, integrated wireline interfaces, and the like. Depending on the implementation, the multicarrier apparatuses may communicate with one another directly (peer-to-peer mode) or the multicarrier apparatuses may communicate via the controller apparatus.

In one implementation, the exemplary communication arrangement may be a home network and the multicarrier controller apparatus may be an access point of the home network. For example, in the implementation the controller apparatus may be a residential gateway that distributes broadband services to the multicarrier apparatuses. The multicarrier apparatuses may be associated with digital content destinations in the home, but may also be associated with digital content sources, such as digital video recorders (DVR), computers providing streaming video, televisions, entertainment centers, and the like.

Furthermore, the multicarrier apparatuses may be enabled to communicate using packet-based technology (e.g., ITU G.hn, HomePNA, HomePlug® AV and Multimedia over Coax Alliance (MoCA)) and xDSL technology. Such xDSL technology may include Asymmetric Digital Subscriber Line (ADSL), ADSL2, ADSL2+, Very high speed DSL (VDSL), VDSL2, G.vector, G.Lite, and High bit rate Digital Subscriber Line (HDSL). In addition, the multicarrier apparatuses 102, 104 and 106 may be enabled to communicate using IEEE 802.11 and IEEE 802.16 (WiMAX) wireless technologies.

Signals exchanged between the multicarrier apparatuses may include multicarrier symbols that each include a plurality of tones or sub-channels. Each of the tones within a multicarrier symbol may have data bits modulated thereon that are intended for delivery from one of the multicarrier apparatuses to another.

An exemplary transceiver apparatus that may be used as a transmitting and receiving apparatus in a multicarrier arrangement or system is described in the following. The multicarrier apparatuses may be implemented in the same or similar manner as the exemplary transceiver apparatus.

The transceiver apparatus may include a transmitter that incorporates a number of different elements. For example, the transmitter may include an encoder, a modulator, a filter, an interface and a controller. As used herein, the term "controller" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The encoder may be capable of receiving data that is for communication to a receiving device coupled to the transceiver apparatus via a wireless or wireline medium. More specifically, the encoder may be capable of translating incoming data bit streams into in-phase and quadrature components for each of the plurality of tones. The encoder may be arranged to output a number of symbol sequences that are equal to the number of tones available to the system. The modulator may be capable of receiving symbol sequences to produce a modulated signal in the form of a discrete multi-tone signal. The modulator may pass the modulated signal to the filter to undergo various filtering and then the filtered signal may be passed to the interface for communication over the medium to a receiving device.

The transceiver apparatus may also include a receiver that is capable of receiving modulated multi-tone signals communicated over the medium from a transmitting device. The receiver may include an interface, a filter, a demodulator, a decoder and a controller. Alternatively, the transceiver apparatus may implement a single controller, instead of the illustrated controllers and. Signals received by the receiver may be passed to the filter via the interface. After received signals undergo filtering by way of the filter, the filtered signals may be demodulated by the demodulator. The demodulated signals may be passed to and processed by the decoder. The decoder produces data bit streams for consumption by a computing device, or the like. Effectively, the demodulator and the decoder perform the opposite functions of the modulator and the encoder, respectively.

Exemplary implementations discussed herein may have various components collocated; however, it is to be appreciated that the various components of the arrangement may be located at distant portions of a distributed network, such as a communications network and/or the Internet, or within a dedicated secure, unsecured and/or encrypted arrangement. Thus, it should be appreciated that the components of the arrangements may be combined into one or more apparatuses, such as a modem, or collocated on a particular node of a distributed network, such as a telecommunications network. Moreover, it should be understood that the components of the described arrangements may be arranged at any location within a distributed network without affecting the operation of the arrangements. For example, the various components can be located in a Central Office modem (CO, ATU-C, VTU-O), a Customer Premises modem (CPE, ATU-R, VTU-R), an xDSL management device, or some combination thereof. Similarly, one or more functional portions of the arrangement may be distributed between a modem and an associated computing device.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium, executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

The implementations herein are described in terms of exemplary embodiments. However, it should be appreciated that individual aspects of the implantations may be separately claimed and One exemplary embodiment is a method for enhancing communication in a system with a plurality of electronic communication connections. Multiple locally optimal configurations and parameters that may be required to build such configurations are pre-computed. Data about the configurations and the parameters are then stored in a memory. Such data is then processed to create time sharing information. Such time sharing information is then conveyed to communication units so that such communication units may transmit at such times and such power levels as to achieve enhanced communication within the system according to some criterion.

The method just described for enhancing communication in a system with a plurality of electronic communication connections, wherein multiple locally optimal configurations and parameters that may be required to build such configurations are re-computed when a new communication unit is added to the system. The method described for enhancing communication in a system with a plurality of electronic communication connections, wherein there are pre-computed multiple locally optimal configurations and parameters that may be required to build such configurations where the communication units have guaranteed data rates and the locally optimal configurations meet or exceed those guaranteed data rates. The method for enhancing communication in a system with a plurality of electronic communication connections, including pre-computing with guaranteed data rates as described, wherein information is received that that one or more communication units is either inactive at a particular time is requires less than a guaranteed data rate at a particular time, and such information about units inactive or requiring less than guaranteed data rates is used to re-calculate a combination of configurations that will server the other units at higher than guaranteed data rates. The method for enhancing communication in a system with a plurality of electronic communication connections, including pre-computing with guaranteed data rates as described, and including reception and use of information about units inactive or using less than the guaranteed rate as described, wherein the communication units include transceivers. The method for enhancing communication in a system with a plurality of electronic communication connections, including pre-computing with guaranteed data rates as described, and including reception and use of information about units inactive or using less than the guaranteed rate as described, wherein the communication units include transceivers and remote terminals.

In this description, numerous specific details are set forth. However, the embodiments/cases of the embodiment may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the embodiment. Moreover, separate references to "one solution", or "some solutions", "one embodiment", "some embodiments", "one case", or "some cases" in this description do not necessarily refer to the same solution/embodiment/case. Illustrated solutions/embodiments/cases are not mutually exclusive, unless so stated and except as will be readily apparent to those of ordinary skill in the art. Thus, the embodiment may include any variety of combinations and/or integrations of the features of the solutions/embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the solutions/embodiments/cases illustrated by the block diagrams. However, the methods of the flow diagrams could be performed by solutions/embodiments/cases of the embodiment other than those discussed with reference to the block diagrams, and solutions/embodiments/cases discussed with reference to the block diagrams could perform operations different from those discussed with reference to the flow diagrams. Moreover, although the flow diagrams may depict serial operations, certain solutions/embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various solutions/embodiments/cases and/or configurations discussed. Furthermore, methods and mechanisms of the solutions/embodiments/cases will sometimes be described in singular form for clarity. However, some solutions/embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces. Certain features of the solutions/embodiments/cases, which may have been, for clarity, described in the context of separate solutions/embodiments/cases, may also be provided in various combinations in a single embodiment/case. Conversely, various features of the solutions/embodiments/cases, which may have been, for brevity, described in the context of a single embodiment/case, may also be provided separately or in any suitable sub-combination. The solutions/embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the solutions/embodiments/cases. Accordingly, unless specifically indicated herein, the order and grouping of the steps is not a limitation of the solutions/embodiments/cases. Solutions/embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A communication method for use in a system having a distribution point and at least one remote terminal coupled to the distribution point via a transmission medium associated with the remote terminal, the method comprising:
providing a medium access plan for all transmission media associated with the at least one remote terminal;

distribute the medium access plan to all of the distribution point and the remote terminal; and for each one of the at least one remote terminal: communicate between the distribution point and the remote terminal according to time sharing information and a plurality of power level configurations comprised in the medium access plan, wherein providing the medium access plan comprises:

for each one of the at least one remote terminal: pre-computing the plurality of power level configurations, wherein the plurality of power level configurations corresponds to a non-zero data rate between the respective remote terminal and the distribution point;

storing in a memory data about the configurations and the parameters;

processing such data to create the time sharing information, the time sharing information specifying, for each one of the plurality of remote terminals, when to switch between the respective plurality of power level configurations.

2. The communication method of claim 1, comprising:
aligning downstream transmissions over all transmission media;
aligning upstream transmissions over all transmission media; and
communicating according to the medium access plan.

3. The communication method of claim 1, the method further comprising:
ensuring pre-determined overlap between downstream and upstream transmissions over any two transmission media coupled to the distribution point;
providing the medium access plan, wherein the medium access plan includes all downstream and upstream transmissions over all active transmission media; and
ensuring that overall duration of upstream and downstream transmissions are equal or less than a number of symbols in a superframe.

4. A system operative to serve multiple electronic communication lines, comprising:
a distribution point, comprising a central unit and a plurality of transceivers;
a crosstalk channel;
wherein the system is configured to compute a plurality of power level configurations, wherein the plurality of power level configurations corresponds to a non-zero data rate on the multiple electronic communication lines, store in memory data about said configurations, process said data into time sharing information comprised in a medium access plan, the time sharing information specifying, for each one of the multiple electronic communication lines, when to switch between the respective plurality of power level configurations, and to convey the medium access plan to the transceivers, wherein the medium access plan includes all downstream and upstream transmissions over all active transmission media.

5. The system of claim 4, wherein each of said plurality of transceivers comprises a front end, comprising a digital front end and an analog front end, and a line driver, wherein the number of front ends in the system is more than one and less than a number of line interfaces; and wherein the system is configured to switch all communication transmissions between the power level configurations, wherein in any power level configuration, the number of active transmission connections is between 0 and the number of front ends, inclusive.

6. The system of claim 4, further comprising a plurality of remote terminals, wherein the system is configured to convey such time sharing information to the remote terminals, wherein such remote terminals later transmit in accordance with such time sharing information.

7. The system of claim 6, wherein:
each remote terminal has a guaranteed data for transmit from the terminal or for reception to the terminal or for both transmit and reception;
the system is configured to calculate the plurality of power level configurations where the system serves all the guaranteed data rates to and from all remote terminals; and
the system is configured to adapt the plurality of power level configurations to serve some remote terminals with higher than guaranteed data rates, when others of the remote terminals either are inactive or require less than their guaranteed rates.

8. The system of claim 4, wherein the system is at least one of: (i) a wireline communication system, (i) a wireless communication system, (iii) a hybrid communication system.

9. A method for enhancing communication in a system with a plurality of electronic communication connections, comprising:
pre-computing a plurality of power level configurations, wherein the plurality of power level configurations corresponds to a non-zero data rate of the plurality of electronic communication connections,
storing in a memory data about the configurations and the parameters;
processing such data to create time sharing information, the time sharing information comprised in a medium access plan and specifying, for each electronic communication connection, when to switch between the respective plurality of power level configurations;
conveying the medium access plan to communication units, wherein the medium access plan includes all downstream and upstream transmissions over all active transmission media.

10. The method of claim 9, further comprising pre-computing a plurality of power level configurations when a new communication unit is added to the system.

11. The method of claim 10, further comprising pre-computing a plurality of power level configurations where the communication units have guaranteed data rates and the locally optimal configurations meet or exceed those guaranteed data rates.

12. The method of claim 11, further comprising:
receiving information that one or more communication units is either inactive at a particular time is requires less than a guaranteed data rate at a particular time;
using said information about units inactive or requiring less than guaranteed data rates to re-calculate a combination of configurations that will serve the other units at higher than guaranteed data rates.

13. A central unit to be part of a communication system operative to serve multiple electronic communication lines, the central unit comprising:
a processor coupled to a storage, the storage including instructions executable by the processor, the instructions at least configured to:
pre-compute a plurality of power level configurations, wherein the plurality of power level configurations corresponds to a non-zero data rate of the plurality of electronic communication lines;

store in the storage data about the power level configurations;

process the data to create time sharing information, the time sharing information comprised in a medium access plan and specifying, for each electronic communication line, when to switch between the respective power level configurations;

convey the medium access plan to communication units, wherein the medium access plan includes all downstream and upstream transmissions over all active transmission media.

14. The central unit according to claim 13, the central unit being configured for receiving electronic data related to receiver channel characteristics; the central unit further having an optimizer adapted to operate an optimization routine to compute multiple locally optimal configurations and to identify locally optimal configuration points corresponding to the plurality of power level configurations to reach desired data rates, the storage configured to store data representing the plurality of power level configurations; the central unit further being adapted to compute the media access plan to achieve optimal system communication according to a criterion, and to convey the media access plan to transceivers for the transceivers to transmit in accordance with the plan.

15. The central unit of claim 14, the central unit being at least one of (i) an electronic receiver adapted to receive electronic data related to channel characteristics, (ii) an electronic transceiver adapted to receive electronic data related to channel characteristics, (iii) an electronic transmitter adapted to convey the media access plan, or (iv) an electronic transceiver adapted to convey the media access plan.

16. The central unit of claim 14, wherein the media access plan comprises at least information about time slots, about when transceivers should transmit, or about power levels at which transceivers should transmit.

17. The central unit of claim 14, comprising a data processing module adapted to compute the media access plan to achieve optimal system communication according to a criterion being one of at least (i) a rule for absolute fairness; (ii) a rule for relative fairness; or (iii) a rule for maximizing the sum of all data rates.

18. A system operative to serve multiple electronic communication lines, comprising:

a distribution point, comprising a central unit and a plurality of transceivers;

a plurality of line interfaces; and a crosstalk channel;

wherein the system is configured to compute a plurality of power level configurations, wherein the plurality of power level configurations corresponds to a non-zero data rate of the plurality of line interfaces, store in memory data about said configurations, process said data into time sharing information comprised in a medium access plan and specifying, for each line interface, when to switch between the respective power level configuration, and to convey the medium access plan to the transceivers wherein such transceivers later transmit in accordance with such time sharing information, wherein the medium access plan includes all downstream and upstream transmissions over all active transmission media.

19. The system of claim 18, wherein each of said plurality of transceivers comprises a front end, comprising a digital front end and an analog front end, and a line driver, wherein the number of front ends in the system is more than one and less than the number of line interfaces; and wherein the system is configured to switch all communication transmissions between the power level configurations, wherein in any power level configuration, the number of active transmission connections is between 0 and the number of front ends, inclusive.

20. The system of claim 18, further comprising a plurality of remote terminals, wherein the system is configured to convey such time sharing information to the remote terminals, wherein such remote terminals later transmit in accordance with such time sharing information.

21. The system of claim 20, wherein:

each remote terminal has a guaranteed data for transmit from the terminal or for reception to the terminal or for both transmit and reception;

the system is configured to calculate power level configurations where the system serves all the guaranteed data rates to and from all remote terminals; and the system is configured to adapt the power level configurations to serve some remote terminals with higher than guaranteed data rates, when others of the remote terminals either are inactive or require less than their guaranteed rates.

* * * * *